(12) United States Patent
Dry et al.

(10) Patent No.: US 10,737,597 B2
(45) Date of Patent: *Aug. 11, 2020

(54) CONDUCTIVE SYSTEM

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 506 days.

This patent is subject to a terminal disclaimer.

(21) Appl. No.: 15/608,157

(22) Filed: May 30, 2017

(65) Prior Publication Data

US 2018/0345830 A1    Dec. 6, 2018

(51) Int. Cl.
  *B60N 2/56* (2006.01)
  *C09J 9/02* (2006.01)
  (Continued)

(52) U.S. Cl.
  CPC ............ *B60N 2/5642* (2013.01); *A47C 7/744* (2013.01); *A47C 7/746* (2013.01); *B60N 2/5635* (2013.01);
  (Continued)

(58) Field of Classification Search
  CPC .. B60N 2/5642; B60N 2/5657; B60N 2/5685; B60N 2/56; B60N 2/5607; B60N 2/5621; B60N 2/5635; B60N 2/5678; G05D 23/1931; G05D 23/1932; G05D 23/1934; G05D 23/1951; C09J 7/35; C09J 7/22;
  (Continued)

(56) References Cited

U.S. PATENT DOCUMENTS 3,648,469 A   3/1972  Chapman
4,043,544 A   8/1977  Ismer
              (Continued)

FOREIGN PATENT DOCUMENTS

CN    201890168 U    7/2011
CN    203651539 U    6/2014
DE    102013021199 A1  7/2014

OTHER PUBLICATIONS

Lee, Dr. Hosung, "Optimal Design of a Thermoelectric Cooling/Heating for Car Seat Comfort" 2014.
(Continued)

*Primary Examiner* — Shawntina T Fuqua
(74) *Attorney, Agent, or Firm* — David Coppiellie; Price Heneveld LLP

(57) ABSTRACT

A seating assembly includes a seat having a seating surface, a first conductor, a second conductor, and a plurality of thermoelectric devices arranged between the first conductor and the second conductor in an elongated strip located proximate the seating surface. A voltage is applied to the thermoelectric devices to thermodynamically influence the seating surface. An air mover is in fluid communication with the thermoelectric devices. A conductive grease is disposed between the first conductor and the plurality of thermoelectric devices, and a conductive adhesive is disposed between the second conductor and the plurality of thermoelectric devices.

10 Claims, 17 Drawing Sheets

(51) Int. Cl.
  *A47C 7/74* (2006.01)
  *G05D 23/19* (2006.01)
  *C09J 7/35* (2018.01)
  *C09J 7/22* (2018.01)
(52) U.S. Cl.
  CPC .............. *B60N 2/5678* (2013.01); *C09J 7/22* (2018.01); *C09J 7/35* (2018.01); *C09J 9/02* (2013.01); *G05D 23/1931* (2013.01)
(58) Field of Classification Search
  CPC ..... C09J 9/02; A47C 7/46; A47C 7/44; A47C 7/744; A47C 7/746; A47C 7/748; A47C 7/74; A47C 7/742
  See application file for complete search history.

(56) References Cited

U.S. PATENT DOCUMENTS

| | | | |
|---|---|---|---|
| 4,626,664 A | 12/1986 | Grise | |
| 4,656,339 A | 4/1987 | Grise | |
| 5,597,200 A | 1/1997 | Gregory et al. | |
| 5,626,021 A | 5/1997 | Karunasiri et al. | |
| 5,835,983 A | 11/1998 | McMahen et al. | |
| 6,019,424 A | 2/2000 | Rueckert et al. | |
| 6,079,485 A | 6/2000 | Esaki et al. | |
| 6,100,463 A | 8/2000 | Ladd et al. | |
| 6,119,463 A | 9/2000 | Bell | |
| 6,291,803 B1 | 9/2001 | Fourrey | |
| 6,786,541 B2 | 9/2004 | Haupt et al. | |
| 7,114,771 B2 | 10/2006 | Lofy et al. | |
| 7,178,344 B2 | 2/2007 | Bell | |
| 7,320,357 B2 | 1/2008 | Pause | |
| 7,475,464 B2 | 1/2009 | Lofy et al. | |
| 7,637,569 B2 | 12/2009 | Krobok et al. | |
| 7,640,754 B2 | 1/2010 | Wolas | |
| 8,359,871 B2 | 1/2013 | Woods et al. | |
| 8,702,164 B2 | 4/2014 | Lazanja et al. | |
| 9,105,808 B2 | 8/2015 | Petrovski | |
| 9,105,809 B2 | 8/2015 | Lofy | |
| 9,272,647 B2 | 3/2016 | Gawade et al. | |
| 9,310,112 B2 | 4/2016 | Bell et al. | |
| 9,335,073 B2 | 5/2016 | Lofy | |
| 9,366,461 B2 | 6/2016 | Bell et al. | |
| 9,440,567 B2 | 9/2016 | Lazanja et al. | |
| 9,560,907 B2 | 2/2017 | Bouix et al. | |
| 9,676,310 B2 | 6/2017 | Fitzpatrick et al. | |
| 2002/0092308 A1* | 7/2002 | Bell .................. | B60H 1/00471 62/3.7 |
| 2003/0041379 A1 | 3/2003 | Habboub et al. | |
| 2003/0102296 A1 | 6/2003 | Nelson et al. | |
| 2003/0186642 A1 | 10/2003 | Aoki | |
| 2004/0036326 A1 | 2/2004 | Bajic et al. | |
| 2004/0139758 A1 | 7/2004 | Kamiya et al. | |
| 2005/0066505 A1 | 3/2005 | Iqbal et al. | |
| 2005/0140189 A1 | 6/2005 | Bajic et al. | |
| 2005/0242081 A1 | 11/2005 | Howick | |
| 2006/0087160 A1 | 4/2006 | Dong et al. | |
| 2006/0130490 A1 | 6/2006 | Petrovski | |
| 2006/0175877 A1 | 8/2006 | Alionte et al. | |
| 2006/0208540 A1 | 9/2006 | Lofy et al. | |
| 2006/0214480 A1 | 9/2006 | Terech | |
| 2007/0040421 A1 | 2/2007 | Zuzga et al. | |
| 2007/0095378 A1 | 5/2007 | Ito et al. | |
| 2007/0101729 A1 | 5/2007 | Aoki et al. | |
| 2007/0158981 A1 | 7/2007 | Almasi et al. | |
| 2007/0176471 A1 | 8/2007 | Knoll | |
| 2007/0234742 A1 | 10/2007 | Aoki et al. | |
| 2008/0047598 A1 | 2/2008 | Lofy | |
| 2008/0087316 A1 | 4/2008 | Inaba et al. | |
| 2008/0142494 A1 | 6/2008 | Blake et al. | |
| 2008/0173022 A1 | 7/2008 | Petrovski | |
| 2009/0025770 A1 | 1/2009 | Lofy | |
| 2009/0033130 A1 | 2/2009 | Marquette et al. | |
| 2009/0179731 A1 | 7/2009 | Ihle et al. | |
| 2010/0300644 A1 | 12/2010 | Chung | |
| 2010/0301642 A1 | 12/2010 | Negrini et al. | |
| 2010/0319744 A1 | 12/2010 | Smythe et al. | |
| 2010/0327637 A1 | 12/2010 | Bajic et al. | |
| 2011/0226751 A1 | 9/2011 | Lazanja et al. | |
| 2011/0227389 A1 | 9/2011 | Gomes et al. | |
| 2011/0240751 A1 | 10/2011 | Rauh et al. | |
| 2012/0000901 A1 | 1/2012 | Bajic et al. | |
| 2012/0228903 A1 | 9/2012 | Abe et al. | |
| 2013/0068748 A1 | 3/2013 | Csonti et al. | |
| 2013/0097777 A1 | 4/2013 | Marquette et al. | |
| 2013/0146116 A1 | 6/2013 | Jovovic et al. | |
| 2014/0152058 A1 | 6/2014 | Line et al. | |
| 2015/0003493 A1 | 1/2015 | Bieck et al. | |
| 2015/0048658 A1 | 2/2015 | Gawade et al. | |
| 2015/0061331 A1 | 3/2015 | Yang | |
| 2015/0069798 A1 | 3/2015 | Bajic et al. | |
| 2015/0266405 A1 | 9/2015 | Fitzpatrick et al. | |
| 2016/0009206 A1 | 1/2016 | Perraut et al. | |
| 2016/0039321 A1 | 2/2016 | Dacosta-Mallet et al. | |
| 2016/0128487 A1 | 5/2016 | Eskridge, III et al. | |
| 2016/0332549 A1 | 11/2016 | Marquette et al. | |
| 2017/0028886 A1 | 2/2017 | Zhang et al. | |
| 2017/0144574 A1 | 5/2017 | Tanaka et al. | |
| 2017/0305301 A1 | 10/2017 | McMillen et al. | |
| 2018/0178692 A1 | 6/2018 | Zhao et al. | |

OTHER PUBLICATIONS

Elarusi, Abdulmunaem H., "Optimal Design of a Thermoelectric Cooling/Heating System for Car Seat Climate Control (CSCC)" 2016. Master's Theses. 720, Western Michigan University, ScholarWorks at WMU.

U.S. Appl. No. 15/608,115, filed May 30, 2017, Docketed New Case—Ready for Examination, Thermally Conductive Tape.

U.S. Appl. No. 15/608,131, filed May 30, 2017, Docketed New Case—Ready for Examination, Conductive Tape Recess.

U.S. Appl. No. 15/608,178, filed May 30, 2017, Second Office Action dated Dec. 20, 2018; Response Due Feb. 20, 2019, Conductive System.

* cited by examiner

CONDUCTIVE SYSTEM

FIELD OF THE DISCLOSURE

The present disclosure generally relates to a vehicle seating assembly, and more particularly to a vehicle seating assembly utilizing localized heating and cooling.

BACKGROUND OF THE DISCLOSURE

Vehicle seat comfort has become increasingly important as passengers take longer trips. Providing cooling and heating in the seat can increase the comfort of passengers.

A variety of vehicle seating assemblies that provide for occupant heating and cooling are known. These vehicle seating assemblies may include assemblies used in autonomous vehicles and public transportation vehicles such as city buses, trolleybuses, trams (or light rail) and passenger trains, rapid transit (metro/subway/underground), and ferries. However, current solutions for providing cooled and heated surfaces often can be too bulky to conform to the seats for which they are intended while still being thermally comfortable and providing support for the occupant. It is therefore desirable to provide a vehicle seating assembly utilizing localized cooling and heating that supports the occupant without being bulky and provides the occupant thermal comfort.

SUMMARY OF THE DISCLOSURE

According to an aspect of the present disclosure, a seating assembly includes a seat having a seating surface, a first conductor, a second conductor, and a plurality of thermoelectric devices arranged between the first conductor and the second conductor in an elongated strip located proximate the seating surface. A voltage is applied to the thermoelectric devices to thermodynamically influence the seating surface. The seating assembly also includes an air mover in fluid communication with the thermoelectric devices. The seating assembly also includes a conductive grease disposed between the first conductor and the plurality of thermoelectric devices and a conductive adhesive disposed between the second conductor and the plurality of thermoelectric devices.

Aspects of the first aspect of the disclosure can include any one or a combination of the following features:
  the first conductor is thermally insulated from the second conductor;
  segments of the second conductor adjacent the thermoelectric devices include outer peripheral portions defining interior spaces wherein the outer peripheral portions include at least two flexibly resilient first tab members and wherein the outer peripheral portions also include at least two flexibly resilient second tab members;
  the at least two flexibly resilient first tab members are at least partially longitudinally aligned with the at least two flexibly resilient second tab members;
  the conductive grease between the first conductor and the plurality of thermoelectric devices allows differential thermal expansion between the plurality of thermoelectric devices and the first conductor;
  portions of the second conductor;
  the portions of the second conductor are adjacent the plurality of thermoelectric devices and the conductive adhesive and are shaped to allow differential thermal expansion between the plurality of thermoelectric devices and the second conductor;
  a centralized ventilation system wherein the air mover is in communication with the centralized ventilation system;
  an air passageway proximate the elongated strip for the fluid communication between the air mover and the thermoelectric devices;
  the second conductor and the plurality of thermoelectric devices are in a modular configuration that may be decoupled from the seating assembly;
  a surface portion is at least partially detachable from a base portion and the second conductor and the plurality of thermoelectric devices are removable from the surface portion;
  a sensor for measuring occupant temperature and a temperature control system in communication with the plurality of thermoelectric devices wherein the sensor is located proximate the occupant, wherein the sensor is in communication with the temperature control system and wherein the temperature control system is in communication with the plurality of thermoelectric devices to control voltage and current to transfer heat away from the seating surface, transfer heat toward the seating surface, or do nothing to achieve a specific occupant temperature; and/or
  the first conductor adjacent to the thermoelectric devices and the second conductor adjacent to the thermoelectric devices are configured to withstand temperature changes from −10 degrees Celsius to 55 degrees Celsius.

According to another aspect of the present disclosure, a seating assembly includes a seat defining a seating surface, a thermoelectric device, and a first conductor and a second conductor. The thermoelectric device is arranged between the first conductor and the second conductor to cool or heat the seating surface.

Aspects of the second aspect of the disclosure can include any one or a combination of the following features:
  the seating surface is substantially rigid;
  the thermoelectric device arranged between the first conductor and the second conductor is within the seat and adjacent the seating surface;
  an enhanced heat sink and an air mover;
  the enhanced heat sink is coupled to the second conductor;
  the air mover is in fluid communication with the thermoelectric device; and/or
  the seating assembly is in a mass transit vehicle.

According to another aspect of the present disclosure, a method of installing a conductive strip within a seating assembly is provided. The method includes at least partially separating a surface portion of the seating assembly from a base portion of the seating assembly. The method includes placing at least a portion of the conductive strip in an elongated area in the surface portion of the seating assembly or the base portion of the seating assembly. The surface portion of the seating assembly is at least partially attached to the base portion of the seating assembly.

Aspects of the third aspect of the disclosure can include any one or a combination of the following features:
  the placing at least a portion of the conductive strip in an elongated area in the surface portion of the seating assembly or the base portion of the seating assembly comprises placing a plurality of thermoelectric devices coupled to a second conductor in an elongated area in the surface portion of the seating assembly;

the seating assembly includes a first conductor; and/or electrically connecting the at least a portion of the conductive strip to an electrical connection in the seating assembly.

These and other aspects, objects, and features of the present disclosure will be understood and appreciated by those skilled in the art upon studying the following specification, claims, and appended drawings.

DETAILED DESCRIPTION

Figure 1:
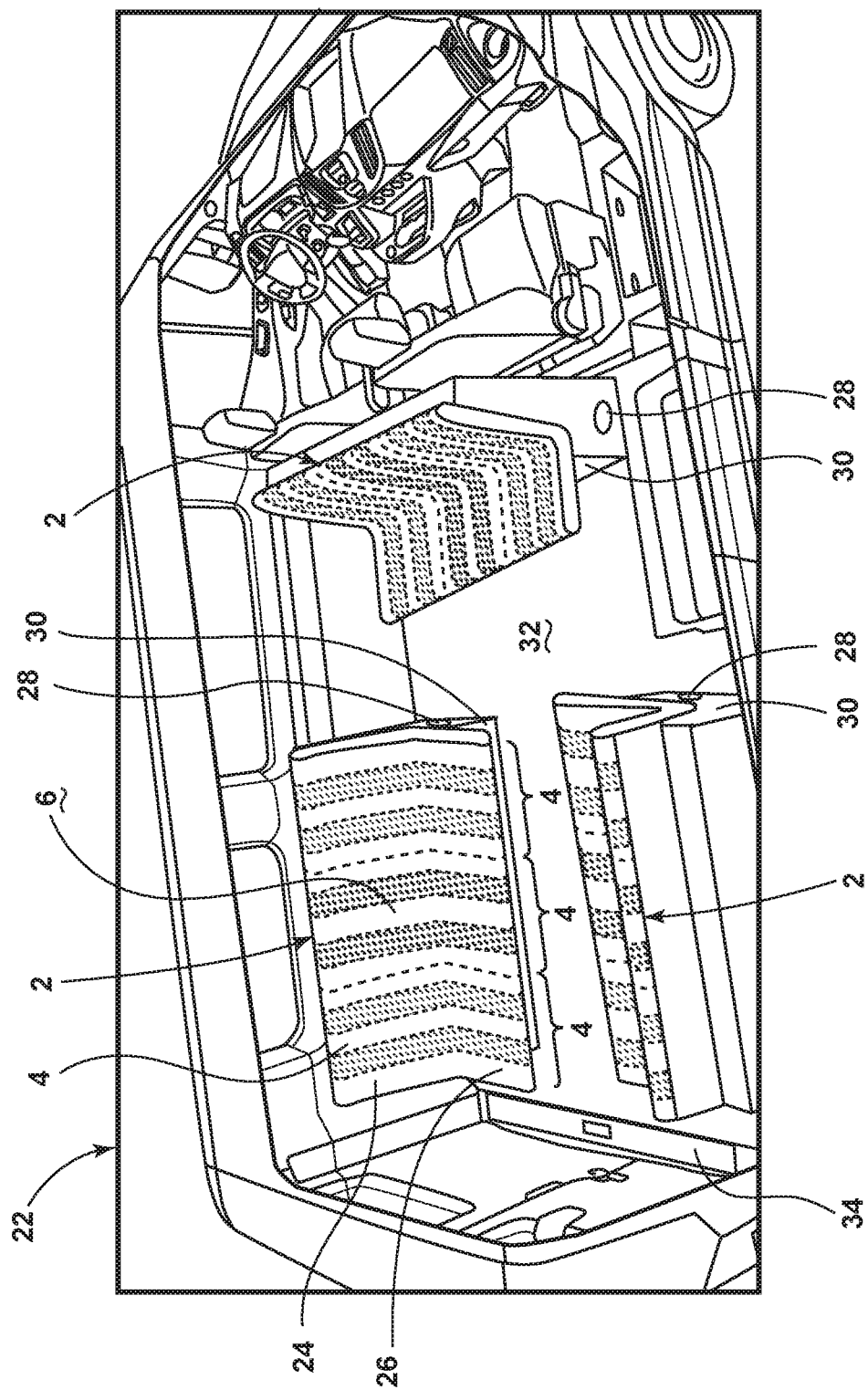
FIG. 1 is a side perspective view of the seating assemblies in a vehicle of an aspect of the present disclosure.

For purposes of description herein, the terms, "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-20, a seating assembly 2 includes a seat 4 having a seating surface 6, a first conductor 8, and a second conductor 10. A plurality of thermoelectric devices 12 are arranged between the first conductor 8 and the second conductor 10 in an elongated strip 14 located proximate the seating surface 6. A voltage is applied to the thermoelectric devices 12 to thermodynamically influence the seating surface 6. An air mover 16 is in fluid communication with the thermoelectric devices 12. A conductive grease 18 is disposed between the first conductor 8 and the plurality of thermoelectric devices 12. A conductive adhesive 20 is disposed between the second conductor 10 and the plurality of thermoelectric devices 12.

Referring to the embodiments generally shown in FIGS. 1-20, reference numeral 22 generally designates a vehicle 22 having seating assemblies 2. The seating assembly 2 provides a seat 4 for one or more persons. The seating assembly 2 may include only one seat 4. In the depicted aspect, seating assemblies 2 each provide seats 4 for three occupants. The seating assemblies 2 may have more or fewer than three seats 4 depending on the needs of the vehicle 22. The seating assembly 2 may be arranged in various configurations depending on the needs of the vehicle. For example, the seating assemblies may be arranged in a back-to-back configuration. The seating assembly 2 includes a seatback 24 and a seat bottom 26. The seatback 24 and the seat bottom 26 are generally configured to provide comfort to a seated occupant. When temperature and atmospheric conditions are not ideal, the seating assembly 2 may be uncomfortably warm or cold, such that the seating assembly 2 is not provided for comfortable transit in a vehicle. Accordingly, providing a temperature control system 28 as generally set forth in FIGS. 1-20 readily changes the temperature at an interface between the occupant and the seating assembly 2, and in particular, between the occupant and the seat bottom 26 and the seatback 24 thus providing for a more pleasant traveling experience for the occupant. With reference to FIG. 1, a seat support 30 connects the seating assembly 2 to the vehicle floor 32. An air supply and exhaust enclosure 34 is also within the vehicle 22. The air supply and exhaust enclosure 34 is in communication with the seating assembly 2 to deliver air to the seating assembly 2 to help with the cooling and heating of the seating assembly 2.

In the depicted aspect, the vehicle 22 may be an autonomous transport vehicle that is equipped with hard, cleanable seating assemblies 2 that need to be cooled and heated. In various aspects, seating assemblies 2 and variations thereof may be used for mass transit, fleet, and other larger occupant vehicles. Mass transit vehicles may include, but are not limited to, ground, air, and aquatic mass transit vehicles such as city buses, trolleybuses, trams (or light rail), passenger trains, rapid transit (metro/subway/underground), ferries, airplanes, helicopters, autonomous vehicles, including autonomous buses, and electric vehicles.

The temperature control system 28 is activated to regulate the temperature of the seating surface 6. The temperature control system 28 may activate the thermoelectric devices 12 to cool or heat the seating assembly 2. The temperature control system 28 may activate an air mover 16 to help cool and heat areas proximate the thermoelectric devices 12. The temperature control system 28 is in communication with a power source of the seating assembly 2. In various aspects, the power source may be a wiring harness. In various aspects, the temperature control system 28 is in communication with various other seating assembly 2 powering means. The temperature control system 28 may be activated by a user or in response to a system input. The temperature control system 28 may be activated manually, remotely, wirelessly, or otherwise. In various aspects, the temperature control system 28 may include sensors 36 that sense occupant temperature and/or interior vehicle temperature and automatically adjust the vehicle seat of an occupant to provide a comfortable seating surface temperature.

Figure 2:
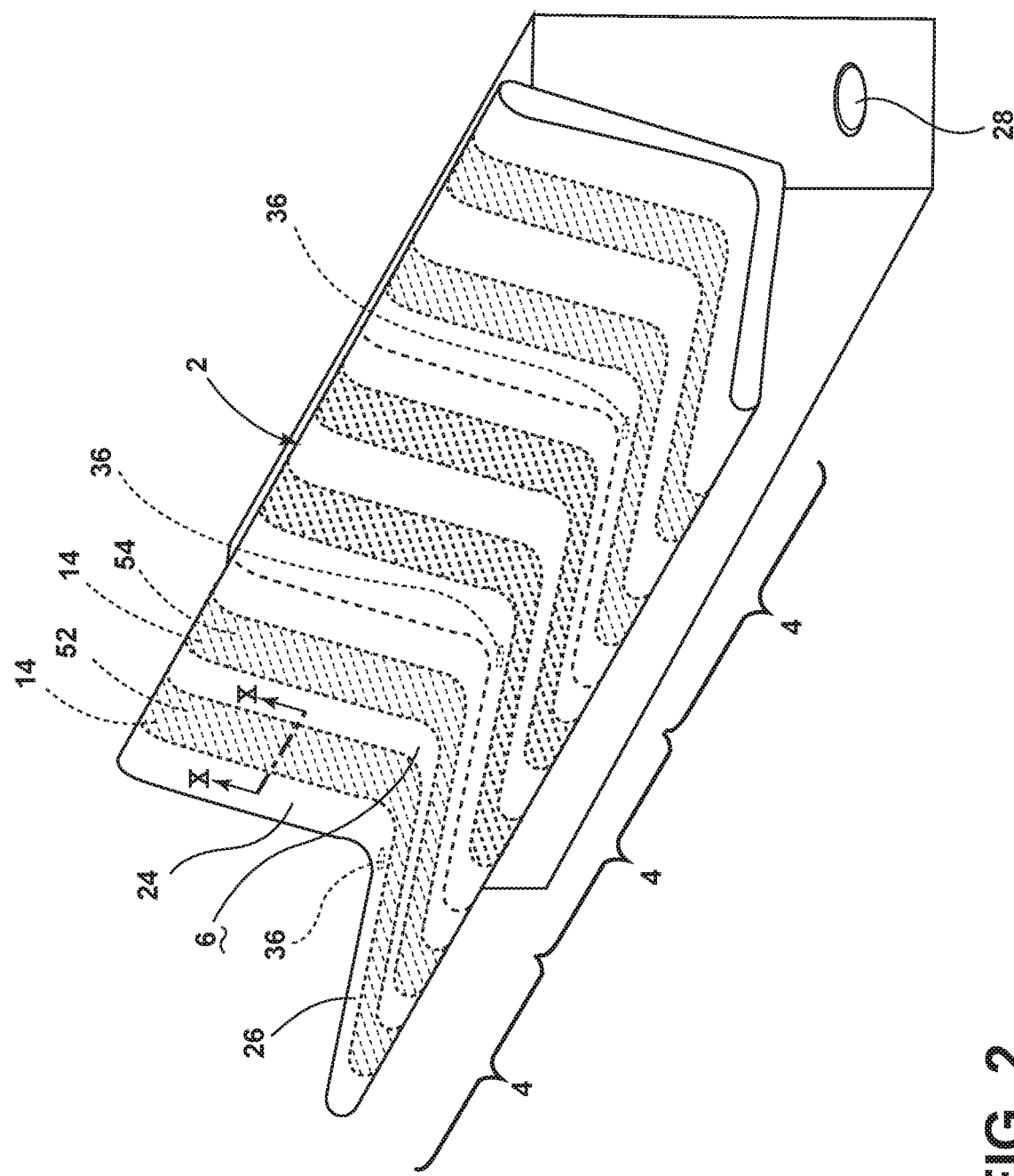
FIG. 2 is a front perspective view of a seating assembly of an aspect of the present disclosure.

Referring now to FIG. 2, the seating assembly 2 is shown in the closed position. The seating assembly 2 includes conductive strips 50 that cool and heat the seating surface 6. In the depicted aspect, the seating assembly 2 includes three seats 4 for three occupants. Each seat 4 is thermodynamically influenced by a first conductive strip 52 and a second conductive strip 54. The first conductive strip 52 cools or heats the occupant's right leg, buttock, and back areas. The second conductive strip 54 cools or heats the occupant's left leg, buttock, and back areas. In various aspects, the seating assembly 2 may have various configurations. For example, the seating assembly 2 may have only a seat bottom 26 and no seatback 24. In various aspects, the arrangement of the conductive strips 50 in the seating assembly 2 may have various configurations. For example, the conductive strips 50 may be arranged horizontally or diagonally. The sensors 36 for measuring occupant temperature may be located proximate each seat 4 or elsewhere. In various aspects, sensors 36 could be located in other vehicle areas from which they could measure an occupant's temperature.

Figure 3:
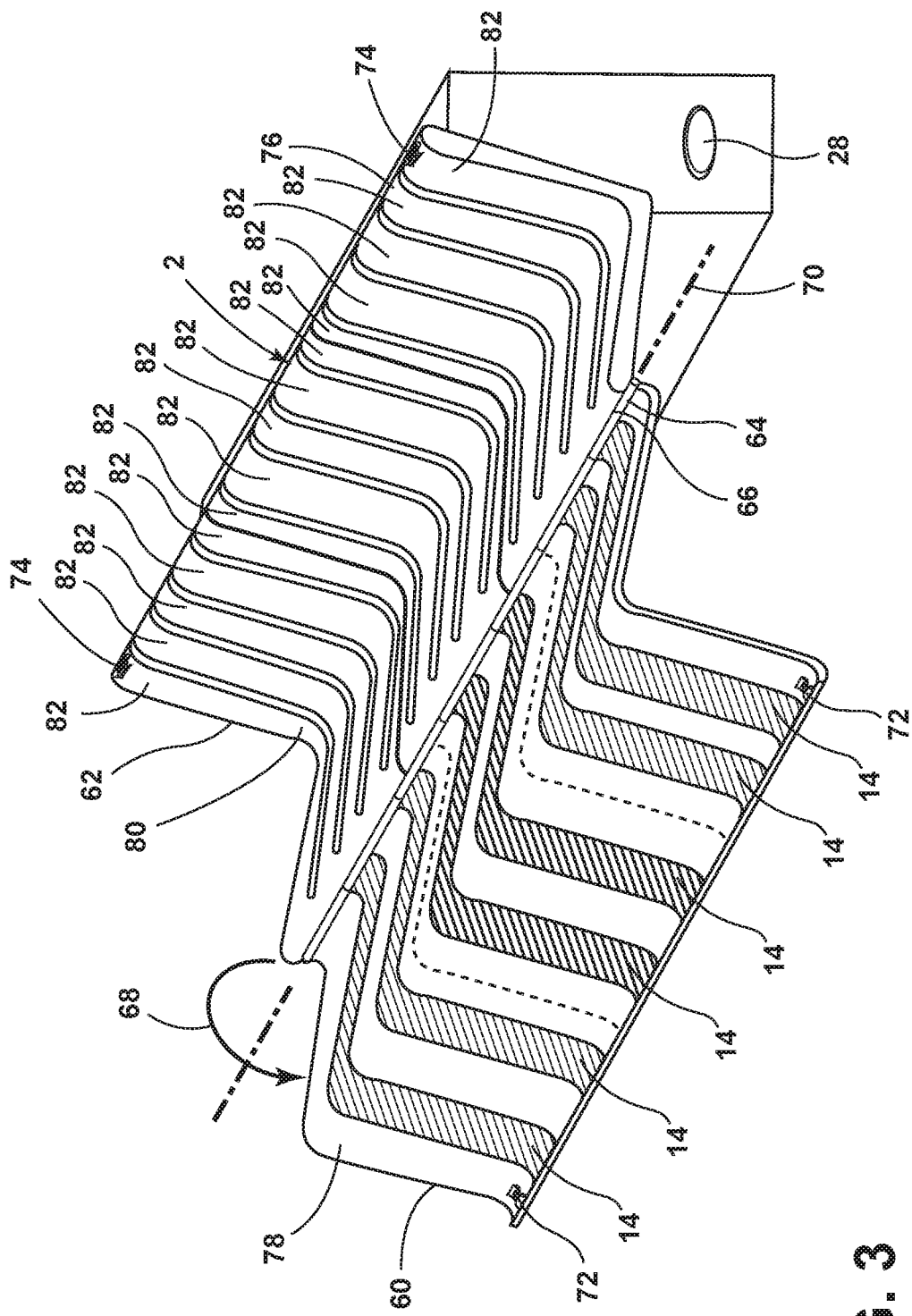
FIG. 3 is a perspective view of the seating assembly of FIG. 2 in an open position of an aspect of the present disclosure.

Referring now to FIG. 3, the seating assembly 2 is shown in the open position. The seating surface portion 60 has been separated from the seating base portion 62. In the depicted embodiment, the seating assembly 2 has a hinge 64 at a front edge 66 that allows for rotation 68 of the seating surface portion 60 around an axis 70. Clips 72 engage with tabs 74 at the upper rear edge 76 of the seating assembly 2 when the seating assembly 2 is in the closed position. The tabs 74 and the clips 72 are disengaged to separate the seating surface portion 60 and the seating base portion 62. The rotation 68 reveals the seating assembly 2 first interior 78 and second interior 80. The first interior 78 includes conductive strips 50. The second interior 80 includes air passageways 82.

Figure 4:
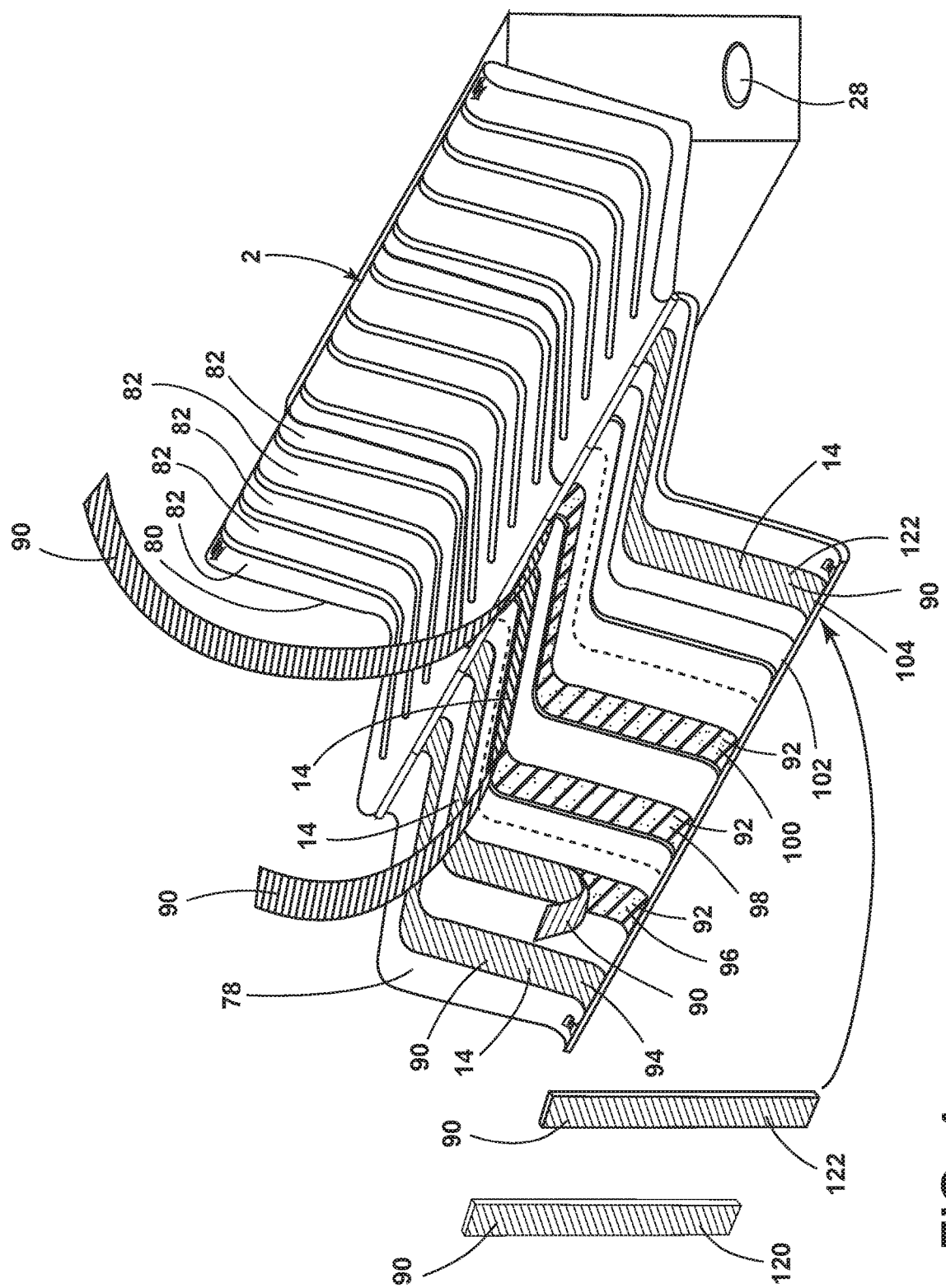
FIG. 4 is a partially exploded perspective view of the seating assembly in an open position with various states of removal of the thermoelectric device assembly of an aspect of the present disclosure.

With reference to FIG. 4, the thermoelectric device assembly 90 is shown in various states of removal from the conductive strip 14 in the first interior 78. When the thermoelectric device assembly 90 is removed from the conductive strip 14, the inlay assembly 92 of the conductive strip 14 remains in the first interior 78. The second interior 80 includes air passageways 82.

Area 94 of FIG. 4 designated by 94 shows a conductive strip 14 in the first interior 78.

Figure 5:
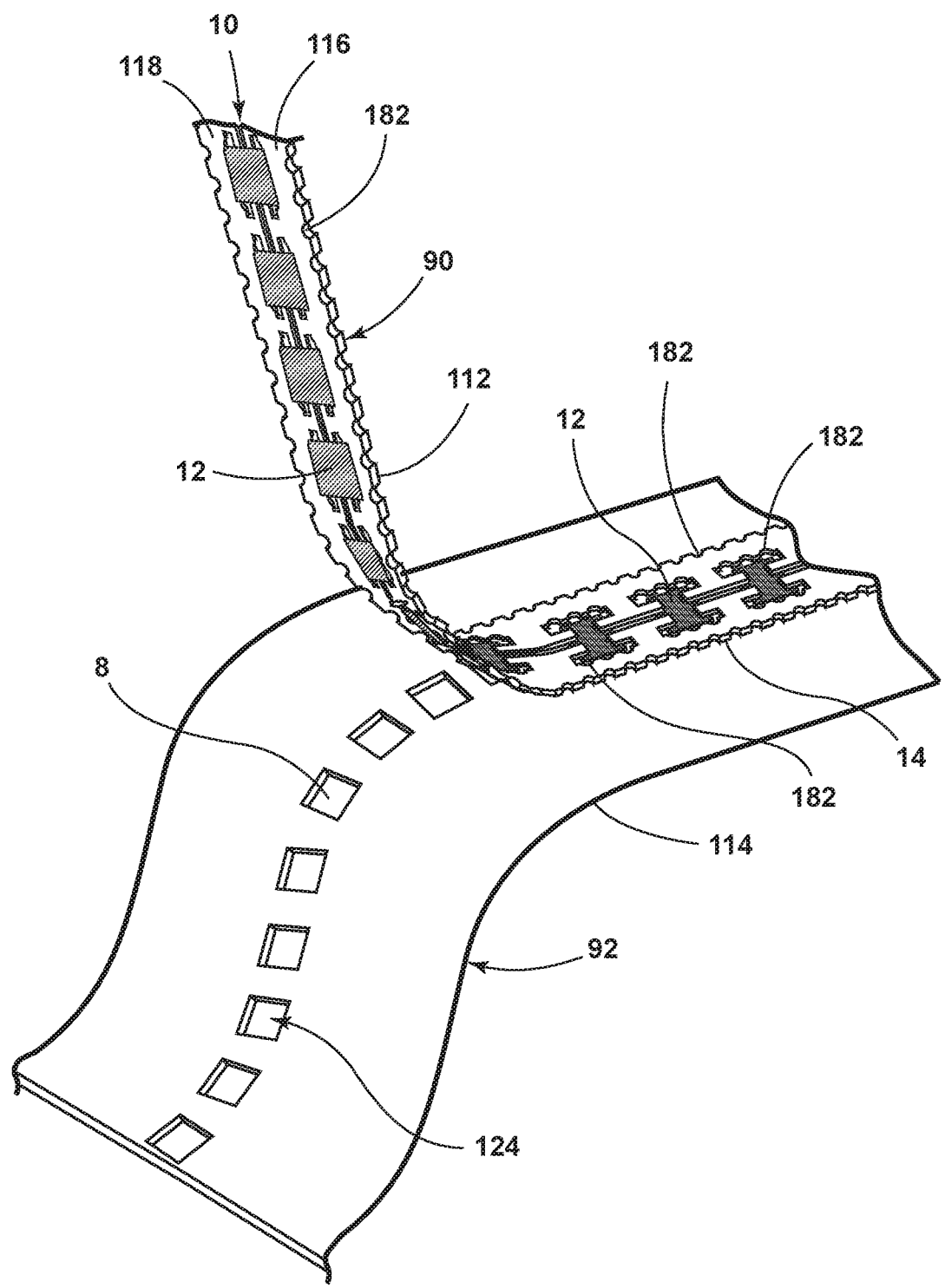
FIG. 5 is an enlarged perspective view of detachment of a thermoelectric subassembly from a conductive strip of an aspect of the present disclosure.

With reference to FIGS. 4-5, the conductive strip 14 includes an inlay assembly 92 and a thermoelectric device assembly 90. The inlay assembly 92 includes the first conductor 8 and the shell 114. The thermoelectric device assembly 90 includes the thermoelectric devices 12 and the second conductor 10. In the depicted aspect, the second conductor 10 has a first portion 116 and a second portion 118. Areas designated within FIG. 4 by 94, 96, 98, 100, 102, 104 show progressive states of removal of the thermoelectric device assembly 90 from the conductive strip 14 and replacement of the thermoelectric device assembly 90 in the conductive strip 14. Area 102 designated by 102 shows the thermoelectric device assembly 90 removed from the conductive strip 14. Area 104 designated by 104 shows a thermoelectric device assembly 90 attached to the inlay assembly 92 to complete the conductive strip 14 from which the thermoelectric device assembly 90 was removed.

As the thermoelectric device assembly 90 is removed from the conductive strip 14, the thermoelectric devices 12 that are in electrical contact with the second conductor first portion 116 and the second conductor second portion 118 are removed from apertures 124 in the shell 114. With reference to FIG. 5, the first conductor 8 is visible in the apertures 124. The thermoelectric device assembly 90 and the inlay assembly 92 are configured in the conductive strip 14 so that a person can manually remove the thermoelectric device assembly 90 from the conductive strip 14. Similarly, a person can manually attach the thermoelectric device assembly 90 to the inlay assembly 92 to form the conductive strip 14. In various aspects, the removal of the thermoelectric device assembly 90 from the conductive strip 14 and/or the attachment of the thermoelectric device assembly 90 to the inlay assembly 92 may be automated or otherwise performed.

Figure 6:
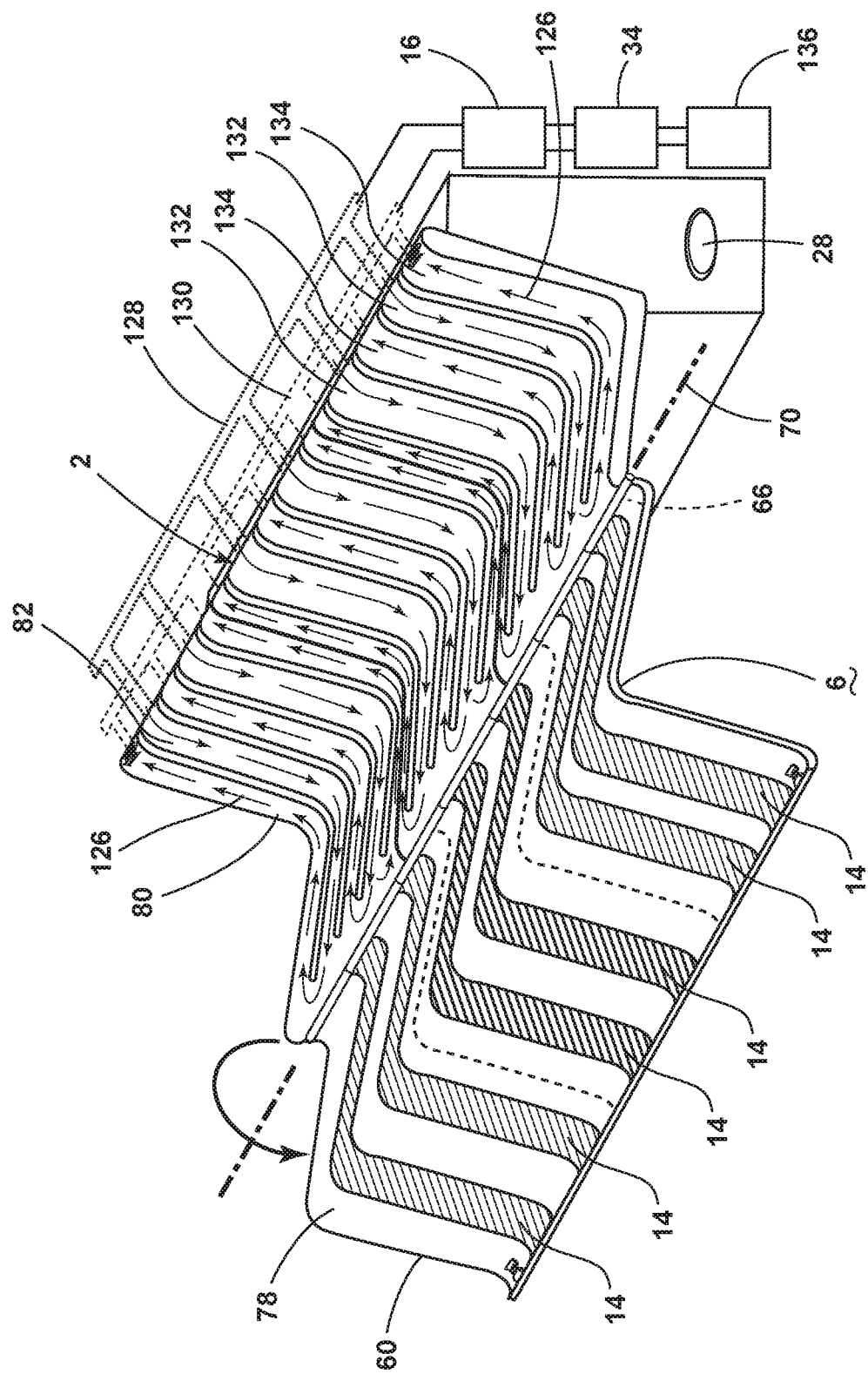
FIG. 6 is a front perspective view of the seating assembly in an open position with airflows of an aspect of the present disclosure.
Figure 7:
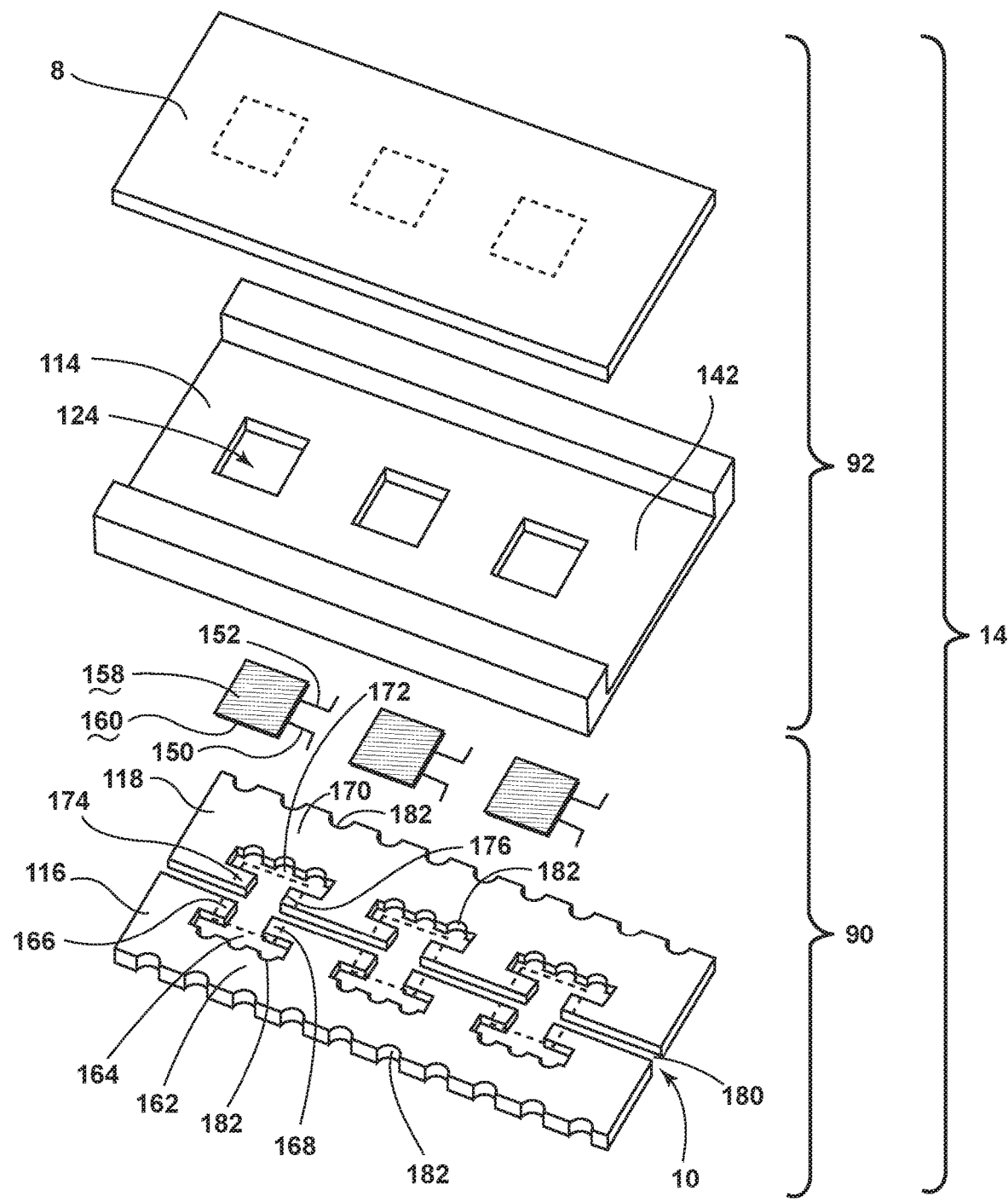
FIG. 7 is an exploded view of the conductive strip of an aspect of the present disclosure.

Referring to FIG. 6, the air passageways 82 are shown in the second interior 80. The air passageways 82 allow airflows 126 to flow beneath the conductive strips 50 in the seating surface portion 60 when the seating assembly 2 is in the closed position. An air mover 16 moves airflows 126 to the inlet conduit 128. Airflows 126 from the inlet conduit 128 move into the inlet ducts 132 and along the second conductor 10 and lower surfaces 160 of the thermoelectric devices 12. The airflows 126 change directions proximate the front edge 66 near the axis 70. The airflows 126 travel through the outlet ducts 134 to the outlet conduit 130. The outlet conduit 130 carries the airflows 126 to the air supply and exhaust enclosure 34.

Airflows 126 help cool or heat the seating surface 6. Airflows 126 moving along the conductive strip 14 carry heat away from the thermoelectric devices 12 when the occupant is being cooled. Airflows 126 moving along the conductive strip 14 deliver energy to the thermoelectric devices 12 when the occupant is being heated. In the depicted aspect, the air mover 16 is in communication with the inlet conduit 128 and the outlet conduit 130. The inlet conduit 128 and the outlet conduit 130 may be in communication with the air supply and exhaust enclosure 34. The air supply and exhaust enclosure 34 may be in communication with the centralized ventilation system 136. In various aspects, the air passageways 82 may be arranged in various configurations that allow for the airflows 126 to travel proximate the conductive strip 14 so that heat is carried away from the thermoelectric devices 12 or delivered to the thermoelectric devices 12.

In various aspects, the airflows may be fluid flows. In various aspects, fluids include but are not limited to a liquid (e.g., water) or a gas (e.g., a refrigerant gas). In various aspects, a fluid may be in various states (e.g., liquid or gas) during operation. In various aspects, a fluid may be selected to meet various seating assembly design parameters.

Referring to FIGS. 4-6, in various aspects of the disclosure, the conductive strip 14 could be located within the second interior 80. In various aspects of the disclosure, the conductive strip 14 could be removed from the seating assembly 2 and replaced with a conductive strip that may or may not be identical to the removed conductive strip 14.

Referring to FIGS. 7-10, an exploded view of the conductive strip 14 is shown. The conductive strip 14 includes the inlay assembly 92 and the thermoelectric device assembly 90. The first conductor 8 of the conductive strip 14 may be a metallic inlay at the seating surface 6. The first conductor 8 may be located beneath a seating assembly 2 skin 140. In the depicted embodiment, the first conductor 8 fits in a depression 142 in the shell 114 of the seating surface 6. The shell 114 has apertures 124 in which the thermoelectric devices 12 are located. In various aspects, the shell 114 is integral to the surface portion 60 of the seating assembly 2 and spans the length of a seating assembly 2. In various aspects, the shell 114 may be approximately the same width as the first conductor 8.

Each thermoelectric device 12 has a first wire 150 and a second wire 152. In the depicted aspect, the second conductor 10 has a first portion 116 and a second portion 118. The second conductor 10 is coupled to the underside of the shell 114. The thermoelectric devices 12 sit between the first conductor 8 and the second conductor 10 in a thermally conductive arrangement. The shell 114 serves as an insulator between the first conductor 8 and the second conductor 10. The thermoelectric device 12 obtains power from the second conductor first portion 116 and the second conductor second portion 118. The thermoelectric device's first wire 150 is electrically connected to the second conductor first portion 116. The thermoelectric device's second wire 152 is electrically connected to the second conductor second portion 118. The second conductor first portion 116 and the second conductor second portion 118 are connected to the power source. The power source provides power to both the second conductor first portion 116 and the second conductor second portion 118. Current will typically flow from the second conductor first portion 116 to the first wire 150 of the thermoelectric device 12 and then to the second wire 152 of the thermoelectric device 12 and the second conductor second portion 118. The current will typically run in a positive to negative direction from the incoming first wire to the outgoing second wire or a negative to positive direction from the incoming first wire to the outgoing second wire. If the current runs from the positive to the negative direction from the incoming first wire to the outgoing second wire, then the thermoelectric device 12 will typically have a cold upper surface and a hot lower surface. If the current runs from the negative to positive direction from the incoming first wire 150 to the outgoing second wire 152, then the thermoelectric device 12 will typically have a hot upper surface 158 and a cold lower surface 160.

The power source supplies power at various voltages to the thermoelectric device 12. The voltage amount determines the temperature differential across the thermoelectric device 12 upper surface 158 and lower surface 160. The second conductor first portion 116 has an outer peripheral portion 162 and an interior portion 164. The second conductor first portion 116 interior portion 164 has an opposing first tab 166 and a second tab 168. The second conductor second portion 118 has an outer peripheral portion 170 and an inner portion 172. The second conductor 10 second portion 118 interior portion 172 has an opposing first tab 174 and a second tab 176. A space 180 is between the first portion 116 of the second conductor 10 and the second portion 118 of the second conductor 10. The space 180 ensures that the second conductor 10 first portion 116 and the second conductor 10 second portion 118 do not contact one another.

Figure 8:
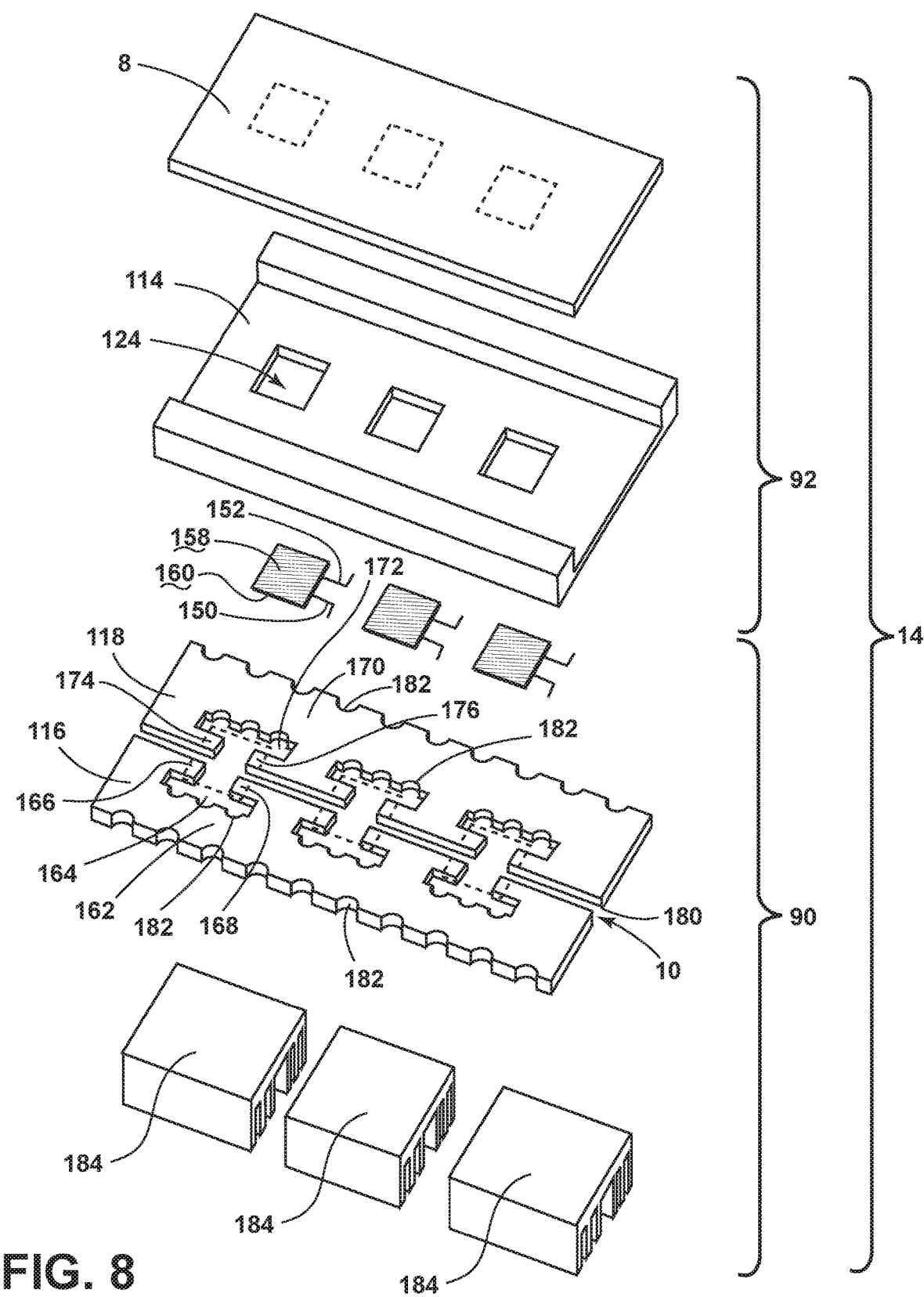
FIG. 8 is an exploded view of the conductive strip of FIG. 7 with an enhanced heat sink of an aspect of the present disclosure.

Referring to FIGS. 5, 7, 8, 9, 17, 18, and 19, in various aspects, the second conductor 10 edges 182 may be serrated for flexibility in multiple directions. Referring to FIG. 8, in various aspects, enhanced heat sinks 184 are coupled to second conductor first portion 116 and second conductor second portion 118 to provide enhanced heat exchange properties to the conductive strip 14. The enhanced heat sinks 184 may be attached to the second conductor 10 with adhesives, welds, tabs, screws, rivets, or other fasteners. The enhanced heat sinks 184 may be made of copper, aluminum, brass, or other conductive materials.

Figure 9:
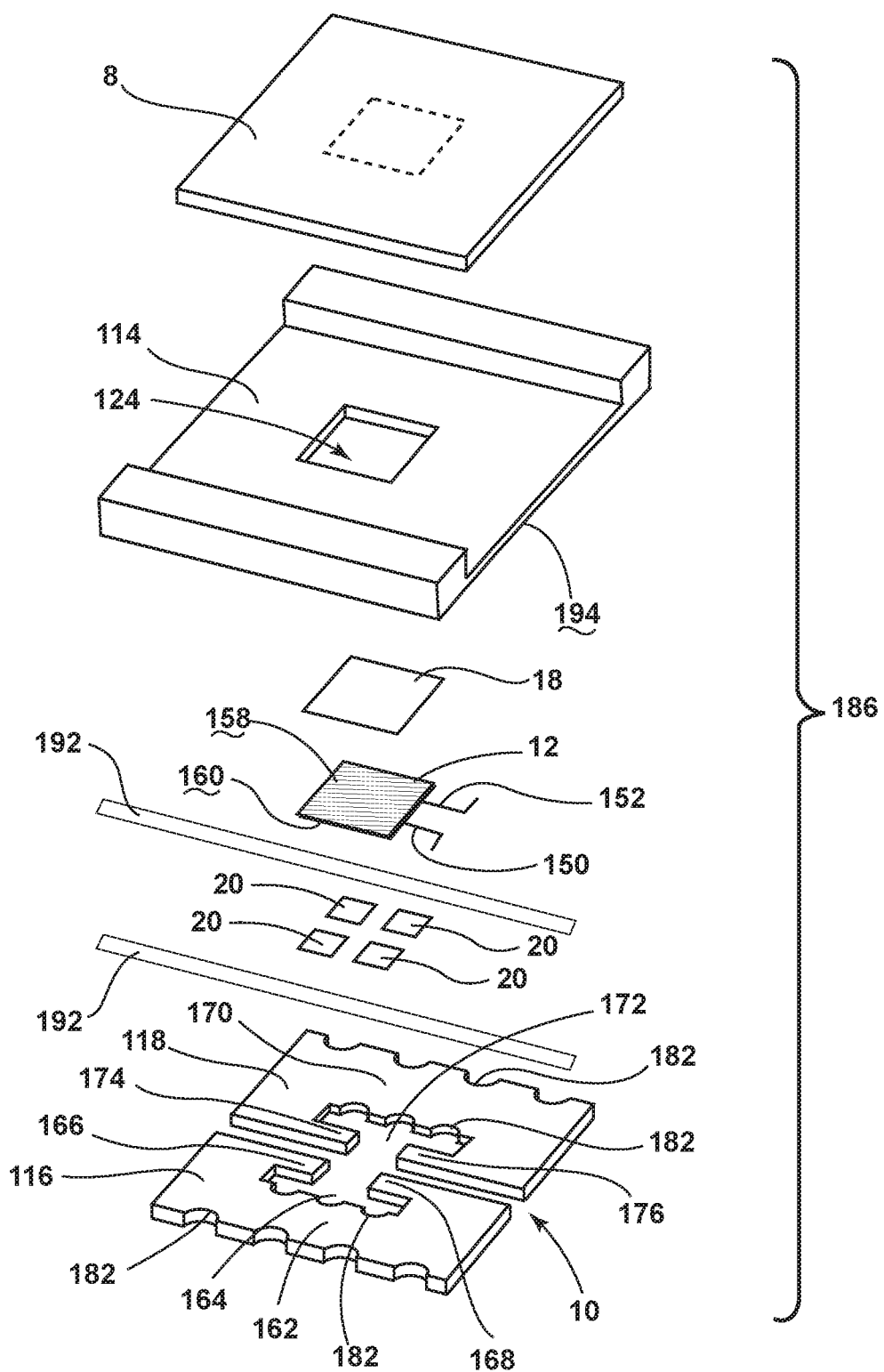
FIG. 9 is an exploded view of a node of the conductive strip of an aspect of the present disclosure.

Referring to FIG. 9, an exploded view of a node 186 of the conductive strip 14 is shown. The node 186 contains the thermoelectric device 12, which powers the conductive strip 14. Thermally conductive grease 18 is disposed between the thermoelectric device 12 upper surface 158 and the first conductor 8. In various aspects, the thermally conductive grease 18 may be a high viscosity grease.

In the depicted aspect, thermally conductive permanent adhesive 20 is located between the thermoelectric device 12 lower surface 160 and the second conductor first portion first tab 166 and first portion second tab 168 and the second conductor second portion first tab 174 and second portion second tab 176. In the depicted aspect, a non-setting removable adhesive 192 is located between the lower surface 194 of the shell 114 and the second conductor first portion 16 outer peripheral portion 162 and the second conductor second portion 118 outer peripheral portion 170. In various aspects, the removable adhesive 192 may have "peel-and-stick" properties that allow the removable adhesive 192 to be removed from the shell 114 and re-applied to the shell 114.

Each thermoelectric device 12 includes pairs of P-type and N-type semi-conductor thermoelement forming thermocouples which are connected electrically in series and thermally in parallel. A standard module includes thermocouples connected in series and sandwiched between two ceramic plates. By applying a current to the module one ceramic plate is heated while the other is cooled. The direction of the current determines which plate is cooled. The number and size of the thermocouples as well as the materials used in their manufacturing determine the cooling capacity. The voltage applied to the thermoelectric device 12 determines the temperature of the thermoelectric device upper surface 158 and the temperature of the thermoelectric device lower surface 160.

Referring again to FIG. 9, in the depicted aspect, the ceramic material that typically is used for the upper surface 158 and the lower surface 160 of the thermoelectric device 12 has a low coefficient of thermal expansion. The copper material that is used in the depicted aspect for the first conductor 8 and the second conductor 10 has a higher coefficient of thermal expansion than the ceramic material of the upper surface 158 and the lower surface 160 of the thermoelectric device 12. The conductive grease 18 between the thermoelectric device 12 upper surface 158 and the first conductor 8 absorbs expansion and contraction of the first conductor 8. The permanent adhesives 190 between the thermoelectric device lower surface 160 and the second conductor 10 may be an adhesive material matrix filled with powdered bits of conductive materials such as silver, zinc, or copper. The adhesive 20 may be soft, springy, elastic, and/or resilient. The adhesive 20 deposits may be in the range of approximately 0.1 mm to approximately 1.00 mm thick. The adhesive 20 has properties, including how much the adhesive 20 flexes during operation and how thick the adhesive 20 should be to accommodate internal adhesive shear and other stresses during operation. The adhesive 20 properties are such that they can withstand the stresses applied to the adhesive 20 during operation of the temperature control system 28 and during typical seating assembly use (knee loads applied by occupants, seating and baggage loads, thermoelectric device assembly removal and replacement loads, etc.).

The removable adhesive 192 between the shell 114 and the second conductor 10 absorbs thermal expansion and contraction of the second conductor 10. The conductive grease 18 and the removable adhesive 192 allow for easy removal of the thermoelectric device assembly 90 from the conductive strip 14. The conductive grease 18 and the removable adhesive 192 allow for easy attachment of the thermoelectric device assembly 90 to the inlay assembly 92.

Figure 10:
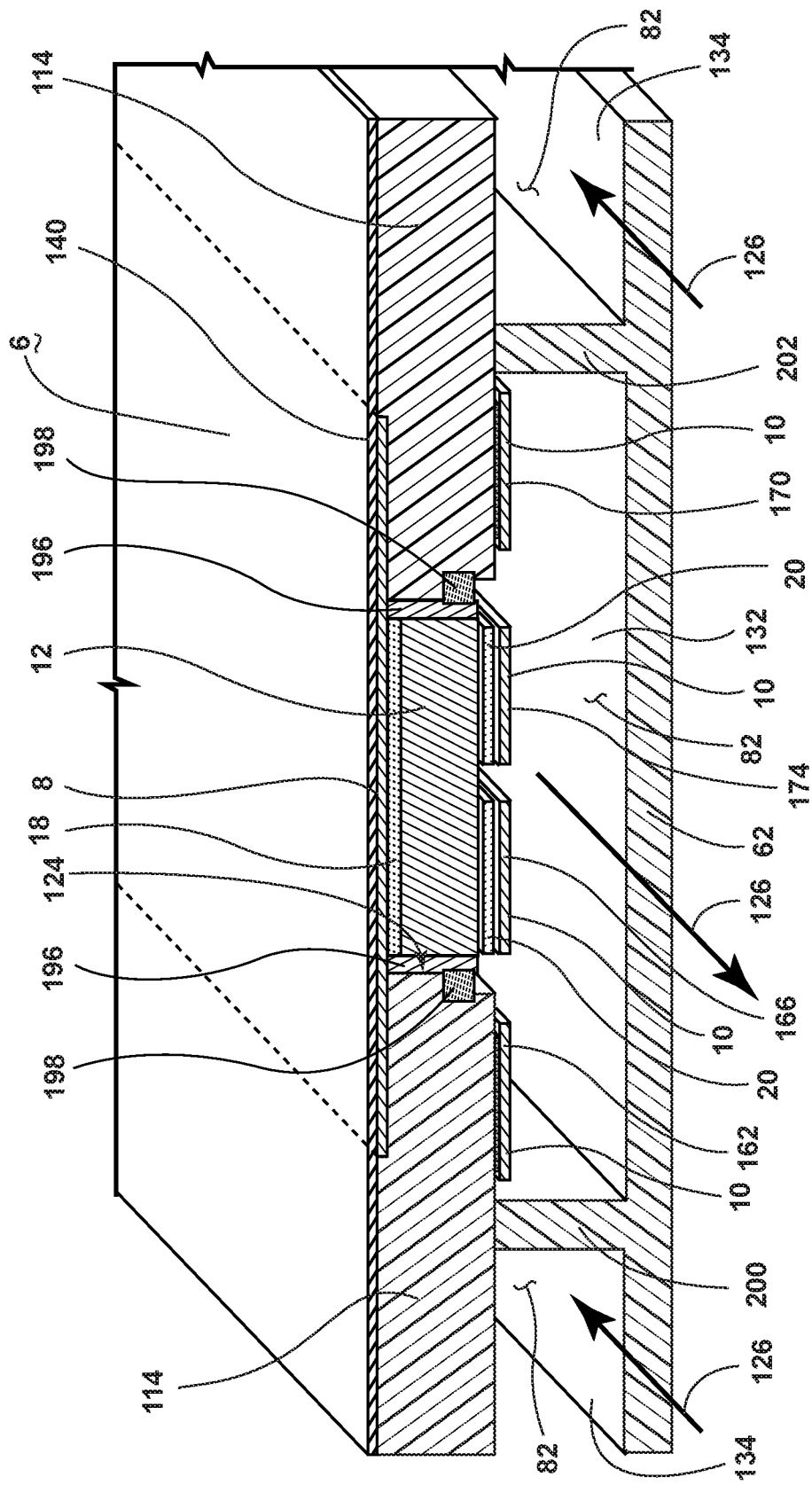
FIG. 10 is a view of a conductive strip with air passageways taken at X-X of FIG. 2 of an aspect of the present disclosure.

Referring to FIG. 10, the conductive strip 14 is depicted within a seating assembly 2 in the closed position. In the depicted aspect, the conductive strip 14 includes the first conductor 8, the thermally conductive grease 18, the shell 114 between the first conductor 8 and the second conductor 10, a potting resin 196, an epoxy 198, the permanent adhesive 20, the removable adhesive 192, the second conductor first portion 116, and the second conductor second portion 118. In various aspects, the potting resin 196 and the epoxy 198 may not be a part of the conductive strip 14 and may be replaced with other or no parts that stabilize the thermoelectric device 12 within the aperture 124 in the shell 114. In various aspects, the thermoelectric devices 12 are potted in resin 196 to improve stability and maximize service life. A skin 140 is coupled to the shell 114 and the first conductor 8. In the depicted aspect, the skin 140 forms the seating surface 6.

In various aspects, the first conductor 8 and/or the second conductor 10 may be copper, aluminum, brass, or another conductive material. In various aspects, the enhanced heatsink 184 may be copper, aluminum, brass and/or another conductive material. In various aspects, the shell 114 may be a hard plastic material. In various aspects, the skin 140 may be a Formica or other hard material.

The seating assembly base portion 62 has a first rib 200 and a second rib 202 that provide structural support to the shell 114 and define air passageways 82. As the conductive strip 14 cools or heats the occupant, the airflows 126 travel through air passageways 82 to carry heat away from the hot lower surfaces of the thermoelectric devices 12 or to carry energy toward the cold lower surfaces 160 of the thermoelectric devices 12. The inlet duct 132 is below the conductive strip 14. After airflow 126 travels into the inlet duct 132 and along the second conductor 10 and the thermoelectric devices 12, the airflow 126 travels into the outlet ducts 134 and along the shell 114 towards the outlet conduit 130. In various embodiments, the airflows 126 do not directly control the seating surface 6 temperature but are a heat sink for the thermoelectric devices 12 to help personalize seating surface 6 temperature for each occupant.

Figure 11:
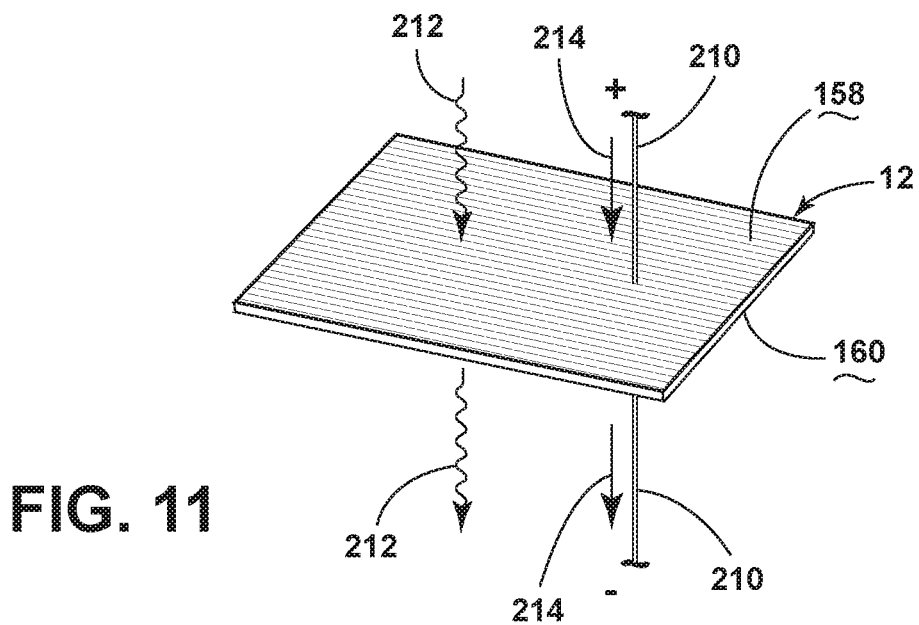
FIG. 11 is an electricity/heat schematic showing heat traveling from the upper surface of the thermoelectric device to the lower surface of the thermoelectric device of an aspect of the present disclosure.
Figure 12:
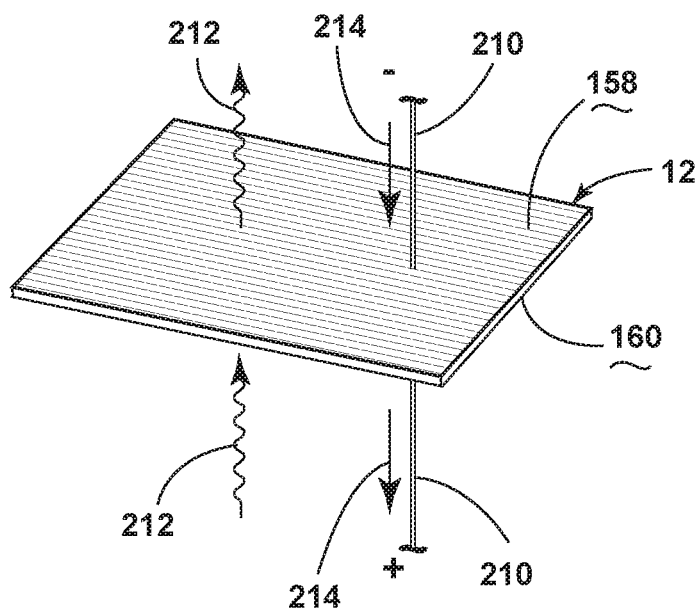
FIG. 12 is an electricity/heat schematic showing heat traveling from the lower surface of the thermoelectric device to the upper surface of the thermoelectric device of an aspect of the present disclosure.

Referring to FIGS. 11 and 12, schematics of current directions and heat flows of the thermoelectric device 12 in the occupant cooling and occupant heating modes are shown. In FIG. 11, current 210 flows into and out of the thermoelectric device 12 in the depicted positive to negative direction. Arrows 214 depict the direction of current 210 flow. Heat 212 flows from the cold thermoelectric device upper surface 158 to the hot thermoelectric device lower surface 160 thereby absorbing heat from around the seating surface 6 and, as a result, cools the seating surface 6. Referring to FIG. 12, current 210 flows into and out of the thermoelectric device 12 in the depicted negative to positive direction. Arrows 214 depict the direction of current 210 flow. Heat 212 is absorbed from the cold thermoelectric device lower surface 160 and heat 212 is simultaneously rejected by the upper surface 158 to heat the seating surface 6.

Figure 13:
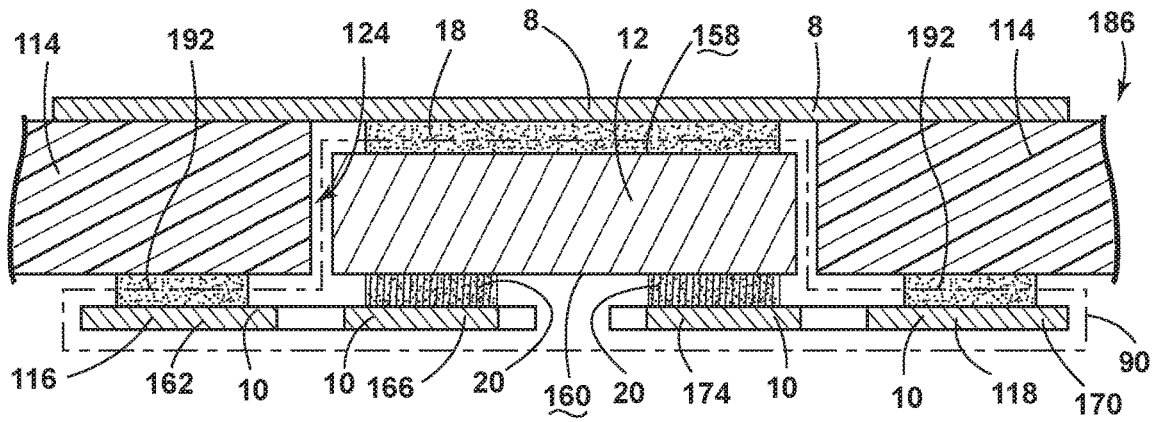
FIG. 13 is a schematic of the thermoelectric device with grease and adhesives and upper and second conductors in an idle view of an aspect of the present disclosure.
Figure 14:
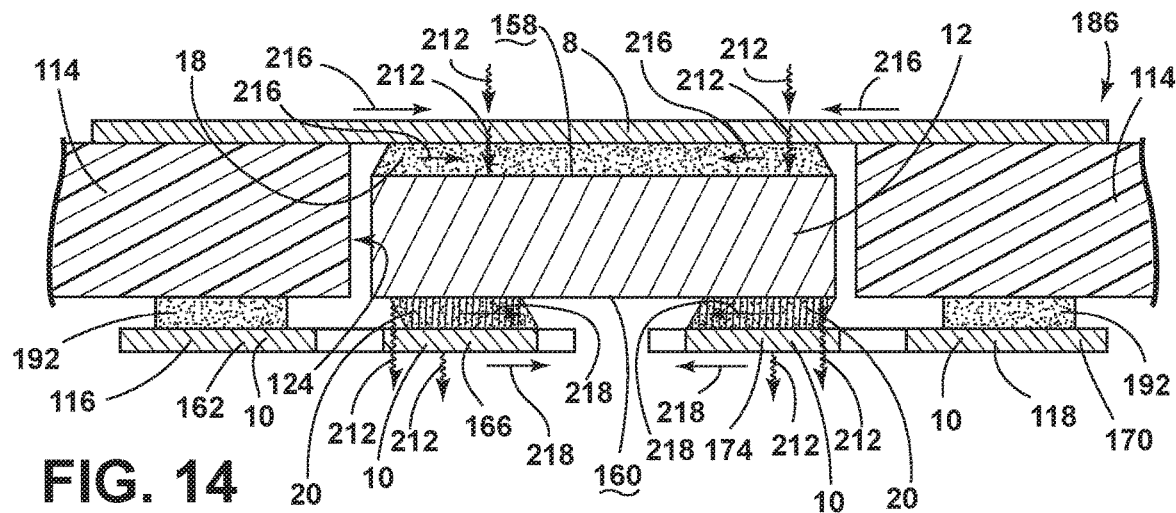
FIG. 14 is a schematic of the thermoelectric device with grease and adhesives and upper and second conductors in the use state of heat traveling from the upper surface of the thermoelectric device to the lower surface of the thermoelectric device.
Figure 15:
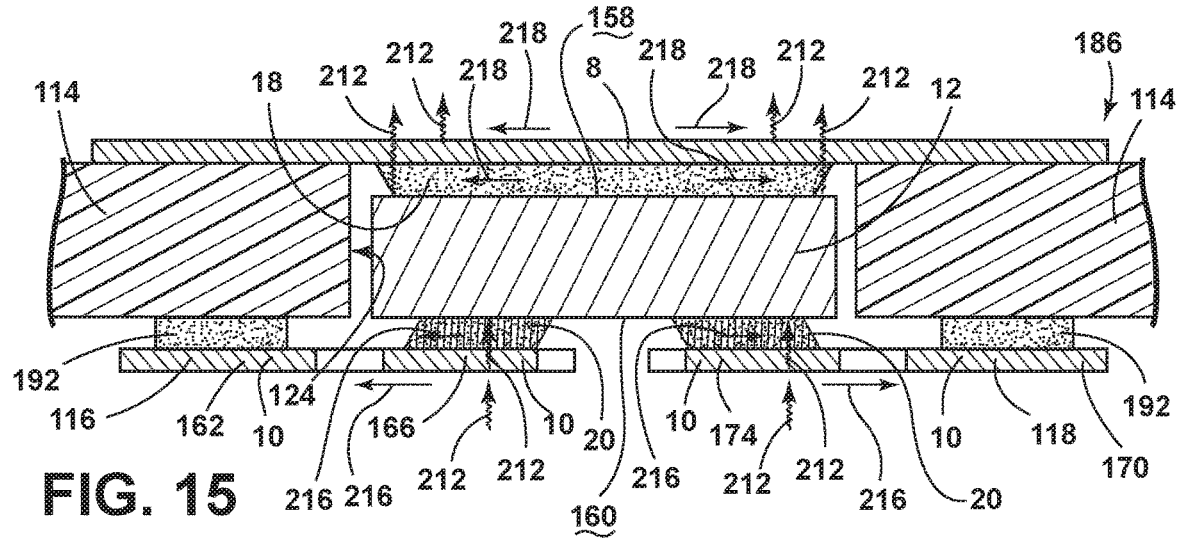
FIG. 15 is a schematic of the thermoelectric device with grease and adhesives and upper and second conductors in the use state of heat traveling from the lower surface of the thermoelectric device to the upper surface of the thermoelectric device.

With reference to FIGS. 13-15, schematics of the heat transfer, deflections, contractions, and movements at node 186 during idle, seating surface cooling, and seating surface heating states are shown.

Referring to FIG. 13, the thermoelectric device 12 in non-use (idle) state is coupled to the first conductor 8 and the second conductor 10. The first conductor 8 is coupled to the upper surface 158 of the thermoelectric device 12 with a conductive grease 18. The second conductor first portion first tab 166 and the second conductor second portion first tab 174 are coupled to the lower surface 160 of the thermoelectric device 12 with permanent adhesive 20. The second conductor first portion outer peripheral portion 162 and the second conductor second portion outer peripheral portion 170 are coupled to the shell 114 with a removable adhesive 192. FIG. 13 depicts the thermoelectric device assembly 90, as designated by 90.

FIG. 14 depicts the thermoelectric device 12 of FIG. 13 when the temperature control system 28 is activated to cool the occupant. Heat 212 is drawn away from the seating surface 6 by the cold upper surface 158 of the thermoelectric device 12. Heat 212 travels through the first conductor 8 and the conductive grease 18 to the cold upper surface 158 of the thermoelectric device 12. During this heat transfer, the first conductor 8 and the conductive grease 18 may contract, as shown by arrows 216. The hot lower surface 160 of the thermoelectric device 12 then transfers heat to the permanent adhesive 20 and the second conductor 10. The heat transfer takes place through the permanent adhesive 20 and the second conductor first portion first tab 166 and the second conductor second portion first tab 174 at heat flows 212. As the second conductor 10 is heated, the second conductor first portion first tab 166, the second conductor second portion first tab 174, the second conductor first portion outer peripheral portion 162, and the second conductor second portion outer peripheral portion 170 may expand slightly and laterally in the directions shown by arrows 218.

FIG. 15 depicts the thermoelectric device of FIG. 13 when the temperature control system 28 is activated to heat the occupant. Heat 212 moves from the air beneath the thermoelectric device 12 through the second conductor 10 and the permanent adhesive 20. Heat 212 moves from the cold lower surface 160 of the thermoelectric device 12 to the hot upper surface 158 of the thermoelectric device 12. During this heat transfer, the second conductor first portion first tab 166, the second conductor second portion second tab 174, the second conductor first portion outer peripheral portion 162, and the second conductor second portion outer peripheral portion 170 and heat conducting adhesive 20 may contract slightly and laterally in the direction shown by arrows 216. The upper surface 150 of the thermoelectric device 12 is hot. Heat 212 moves through the thermally conductive grease 18 and through the first conductor 8. The first conductor 8 and the thermally conductive grease 18 may expand slightly and laterally in the directions shown by arrows 218.

The thermally conductive grease 18 allows the first conductor 8 to laterally expand, contract, and deflect while remaining in physical and thermal contact with the thermoelectric device 12 upper surface 158. Referring to FIG. 9, and FIGS. 11-15, in the depicted aspect, the second conductor first portion first tab 166 and second tab 168, the second conductor second portion first tab 174 and second tab 182, the second conductor first portion outer peripheral portion 162, and the second conductor second portion outer peripheral portion 170 designs allow the copper first conductor 116 and the copper second conductor 118 to expand toward or move away from the thermoelectric device 12 and alleviate shear stress to the ceramic upper surface 158 and the ceramic lower surface 160. In some aspects, the thermoelectric devices 12 may undergo tens of thousands of hot and cold cycles during their lifetimes. The first conductor 8 and the second conductor 10 move within the elastic limits of their intended use. In some aspects, the thermoelectric device 12 upper surface 158 and the lower surface 160 negligibly expand or contract. Flexible joints including the first conductor 8, the conductive grease 18, the permanent adhesive 20, the second conductor first portion first tab 166, and second tab 168 and the second conductor second portion first tab 174 and second tab 176 help the thermoelectric device 12 remain intact during the conductive strip's lifetime. The flexible joints including the second conductor first portion outer peripheral portion 162, the second conductor second portion outer peripheral portion 170 and the removable adhesive 192 may also help the thermoelectric device 12 remain intact during the conductive strip's 50 lifetime. A flexible joint between the thermoelectric device 12 and the second conductor first portion first tab 166 and second tab 168 and the second conductor second portion first tab 174 and second tab 176 helps prevent the permanent adhesive 20 from breaking. In various aspects, the hot surface of the thermoelectric device 12 may be approximately 50 degrees Celsius, and the cold surface of the thermoelectric device 12 may be approximately 35 degrees Celsius.

Figure 16:
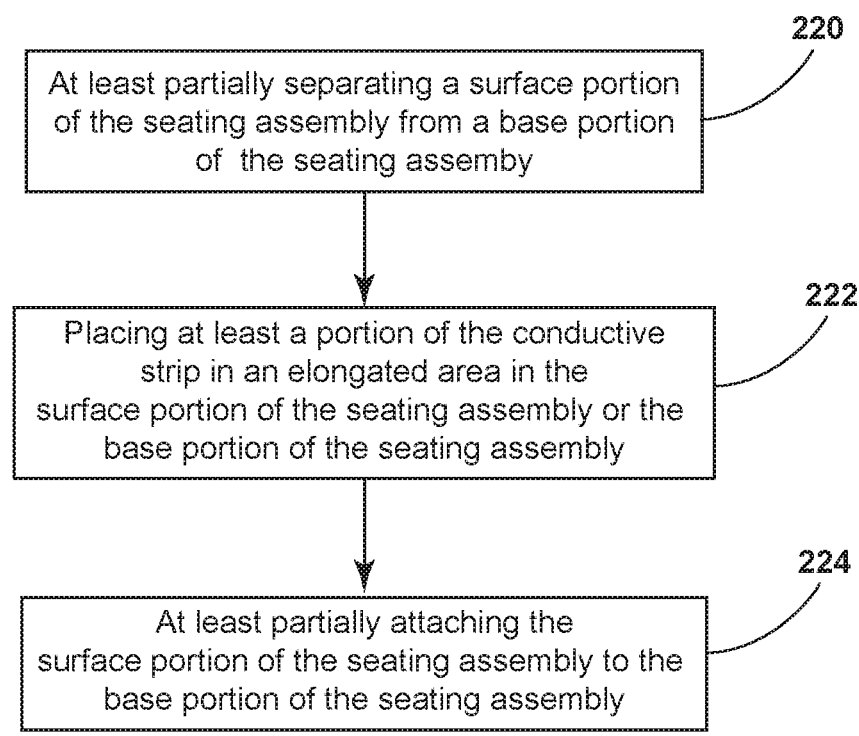
FIG. 16 is a flow diagram of a method of installing at least a portion of a conductive strip within a seating assembly according to an aspect of the present disclosure.
Figure 17:
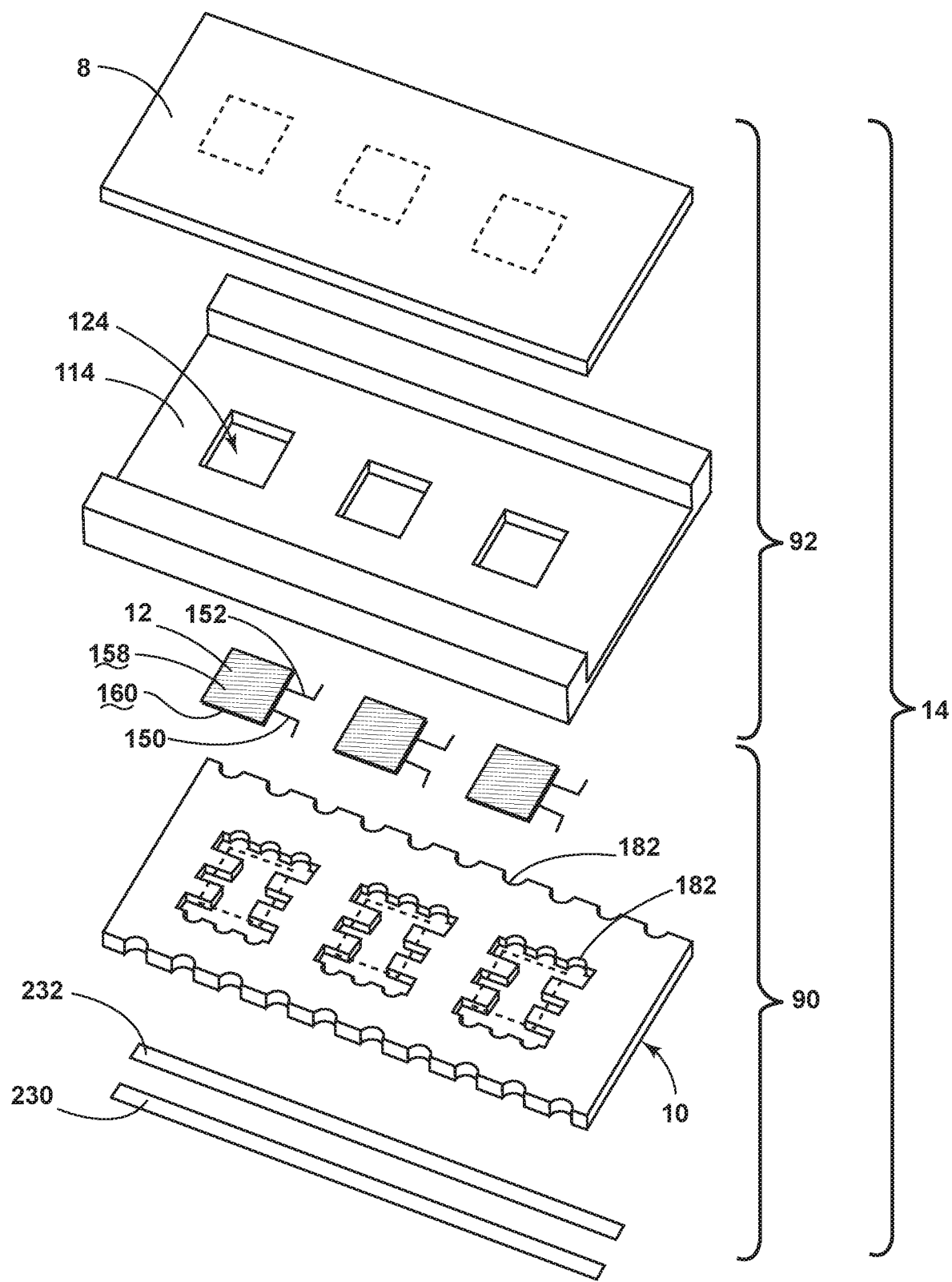
FIG. 17 is an exploded view of the conductive strip of an aspect of the present disclosure.

FIG. 16 depicts a flowchart of the method of installing a conductive strip 14 within a seating assembly 2 of the depicted aspect. Step 220 provides for at least partially separating a surface portion of the seating assembly from a base portion of the seating assembly. Step 222 provides for placing at least a portion of the conductive strip 14 in an elongated area in the surface portion of the seating assembly or the base portion of the seating assembly. Step 224 provides for at least partially attaching the surface portion of the seating assembly to the base portion of the seating assembly.

With reference to FIGS. 17-20, an alternate aspect of the conductive strip 14 is shown. In the depicted aspect, the thermoelectric device 12 has a first power source 230 and a second power source 232. The first power source 230 and the second power source 232 are proximate the second conductor 10. The first wire 150 of the thermoelectric device 12 is connected to the first power source 230. The second wire 152 of the thermoelectric device 12 is connected to the second power source 232. The thermoelectric device 12 obtains power from the first power source 230 and the second power source 232. The first power source 230 and the second power source 232 are connected to the wiring harness or any other means for delivering power within a vehicle. Current typically flows from the first power source 230 to the first wire 150 of the thermoelectric device 12 and then to the second wire 152 of the thermoelectric device 12 and the second power source 232. The current will typically run in a positive to negative direction from the incoming first wire to the outgoing second wire or a negative to positive direction from the incoming first wire to the outgoing second wire. If the current runs from a positive to a negative direction from the incoming first wire to the outgoing second wire, then the thermoelectric device 12 will typically have a cold upper surface 158 and a hot lower surface 160. If the current runs from a negative to a positive direction from the incoming first wire 150 to the outgoing second wire 152, then the thermoelectric device 12 will typically have a hot upper surface 158 and a cold lower surface 160.

Figure 18:
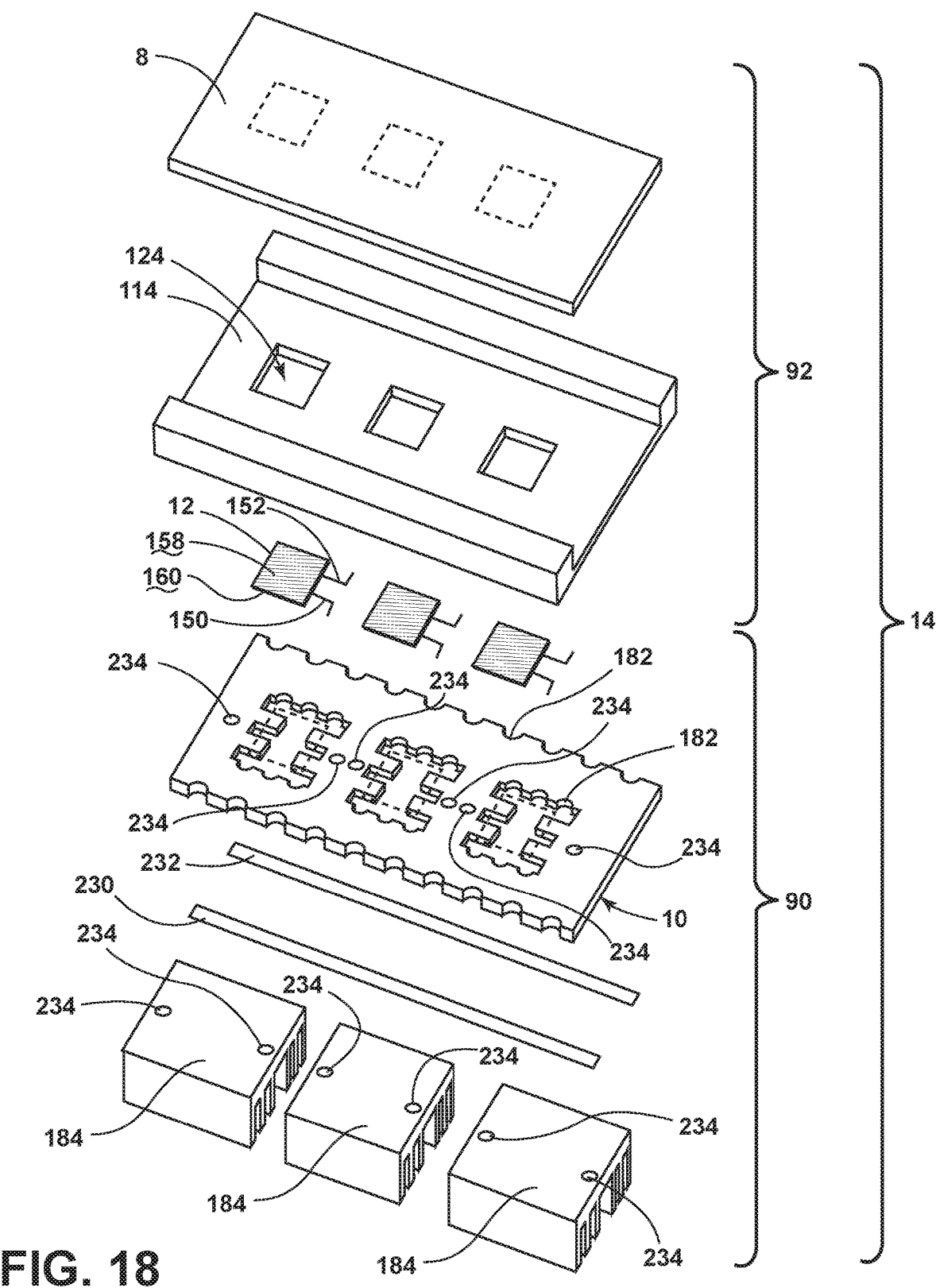
FIG. 18 is an exploded view of the conductive strip of FIG. 17 with heat sinks of an aspect of the present disclosure.

In various aspects, FIG. 18 depicts enhanced heat sinks 184 coupled to second conductor 10. The enhanced heat sinks 184 provide enhanced heat exchange properties to the conductive strip 14. The enhanced heat sinks 184 may be attached with rivets that engage in rivet holes 234. The enhanced heat sinks 184 may also be attached with other fasteners such as tabs, screws, adhesives, or welds. In various aspects, the enhanced heat sinks 184 may be integral parts of the second conductor 10.

Figure 19:
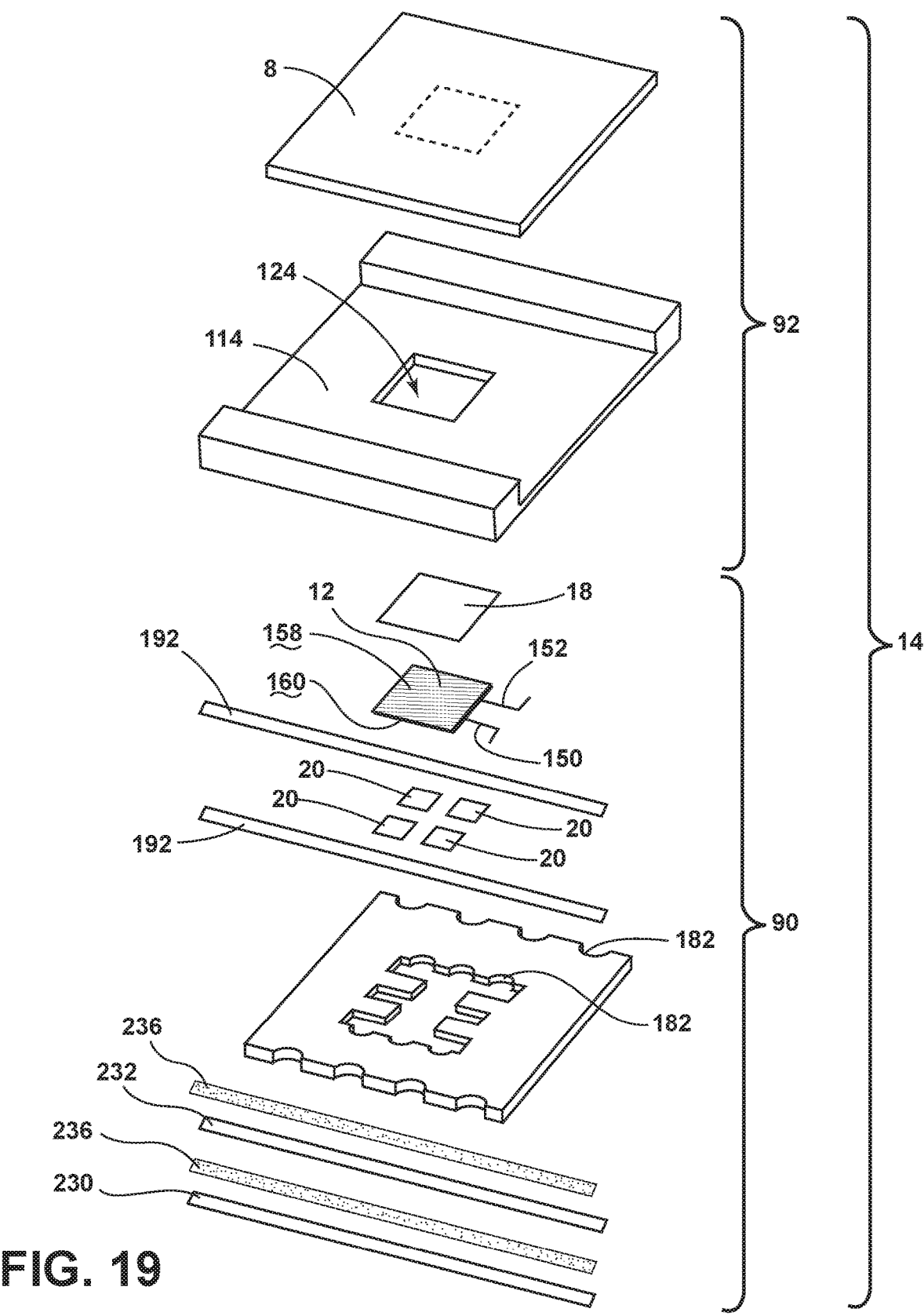
FIG. 19 is an exploded view of a node of the conductive strip of an aspect of the present disclosure.
Figure 20:
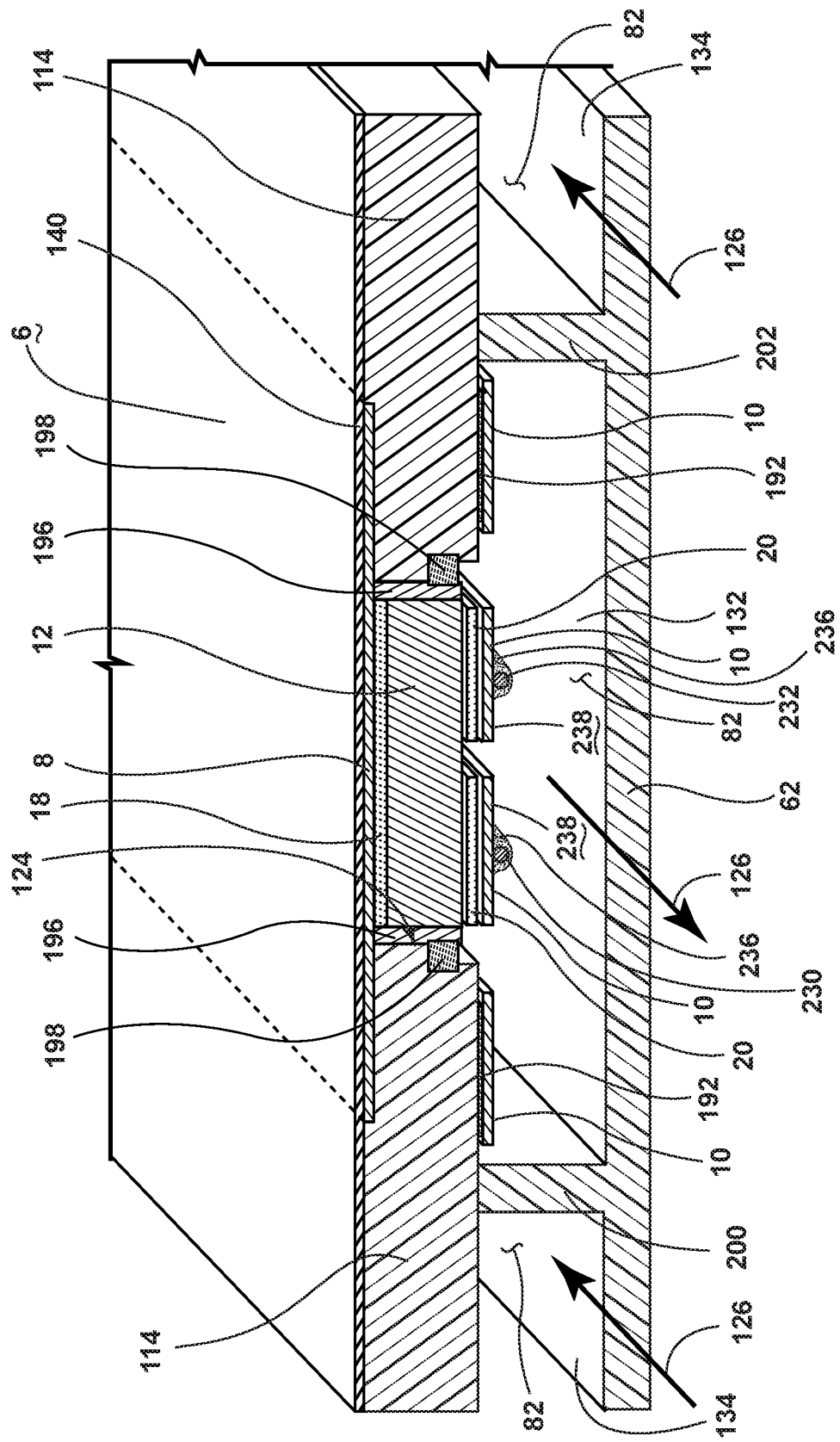
FIG. 20 is a view of a conductive strip with air passageways of an aspect of the present disclosure.

Referring to FIG. 19, an exploded view of a node of the alternate aspect is shown. The first power source 230 and the second power source 232 are depicted with adhesive strips 236 that may be used to mount the first power source 230 and the second power source 232 to the second conductor 10. Referring to FIG. 20, the first power source 230 and the second power source 232 are shown at the lower surface 238 of the second conductor 10. The first power source 230 and the second power source 232 are mounted to the second conductor 10 with adhesives 236. In various aspects, as shown in FIGS. 4 and 5, when the thermoelectric device assembly 90 is removed from the conductive strip 14, the first power source 230 and the second power source 232 are disconnected from the vehicle power source and removed with the thermoelectric device assembly 90. The first power source 230 and the second power source 232 are attached to the power source when a thermoelectric device assembly 90 is installed.

In various aspects, each seat 4 is equipped with two or more infra-red or other occupant temperature measuring systems (e.g., sensors, thermistors) in the seat back 24 and seat bottom 26. In various aspects, the temperature control system 28 will direct the appropriate power to the thermoelectric devices 12 and back off to zero power as the occupant returns to a normal temperature condition.

In various aspects, the first rib 200 and the second rib 202 may extend from the shell 114 of the surface portion 60 towards the base portion 62 of the seating assemblies 2.

In various aspects, the conductive strip 14 may be a flexible module that fits into a seating assembly 2 proximate the seating surface 6.

In various aspects, permanent adhesive 20 may be a non-permanent adhesive. In various aspects, removable adhesive 192 may be a non-removable adhesive. In various aspects an adhesive or other conductive material may fully or partially replace the conductive grease 18.

A variety of advantages may be derived from the use of the present disclosure. An occupant is able to enjoy an automatically controlled seat 4 that is equipped to be cooled and heated individually in response to occupant needs. Hard, cleanable seating may be equipped with conductive strips 50 that quickly cool or heat an occupant in response to individual occupant needs. The design of the first conductor 8, the second conductor 10, the conductive grease 18, and the permanent adhesive 20 near the thermoelectric device 12 allow for differential thermal expansion of the first conductor 8 and the second conductor 10 during cooling and heating of the seating surface 6. The thermoelectric device assemblies 90 may be easily removed from the seating assembly 2 for service and/or replacement. An enhanced heat sink 184 provides greater surface area for heat transfer.

It will be understood by one having ordinary skill in the art that construction of the described disclosure, and other components, is not limited to any specific material. Other exemplary aspects of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary aspects, is illustrative only. Although only a few aspects of the present innovations have been described in detail in this disclosure, those skilled in the art who review this disclosure will readily appreciate that many modifications are possible (e.g., variations in sizes, dimensions, structures, shapes, and proportions of the various elements, values or parameters, mounting arrangements, use of materials, colors, orientations, etc.) without materially departing from the novel teachings and advantages of the subject matter recited. For example, for elements shown as integrally formed, the operation of the interfaces may be reversed or otherwise varied, the length or width of the structures and/or members or connectors to other elements of the system may be varied, and the nature or numeral of adjustment positions provided between the elements may be varied. It should be noted that the elements, and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary aspects without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting. It is also to be understood that variations and modifications can be made on the aforementioned structures and methods without departing from the concepts of the present disclosure, and further it is to be understood that such concepts are intended to be covered by the following claims unless these claims by their language expressly state otherwise. Further, the claims as set forth below are incorporated into and constitute part of this Detailed Description.

What is claimed is:

1. A seating assembly comprising:
   a seat having a seating surface;
   a first conductor;
   a second conductor;
   a plurality of thermoelectric devices arranged between the first conductor and the second conductor in an elongated strip located proximate the seating surface, wherein a voltage is applied to the thermoelectric devices to thermodynamically influence the seating surface;
   an air mover in fluid communication with the thermoelectric devices;
   a conductive grease disposed between the first conductor and the plurality of thermoelectric devices; and
   a conductive adhesive disposed between the second conductor and the plurality of thermoelectric devices, wherein the conductive grease between the first conductor and the plurality of thermoelectric devices allows differential thermal expansion between the plurality of thermoelectric devices and the first conductor.

2. The seating assembly of claim 1 wherein segments of the second conductor adjacent the thermoelectric devices include outer peripheral portions defining interior spaces wherein the outer peripheral portions include at least two flexibly resilient first tab members and wherein the outer peripheral portions also include at least two flexibly resilient second tab members.

3. The seating assembly of claim 2 wherein the at least two flexibly resilient first tab members are at least partially longitudinally aligned with the at least two flexibly resilient second tab members.

4. The seating assembly of claim 1 further comprising portions of the second conductor, wherein the portions of the second conductor are adjacent the plurality of thermoelectric devices and the conductive adhesive and are shaped to allow differential thermal expansion between the plurality of thermoelectric devices and the second conductor and wherein the first conductor is thermally insulated from the second conductor.

5. The seating assembly of claim 1 wherein the second conductor and the plurality of thermoelectric devices are in a modular configuration that may be decoupled from the seating assembly.

6. The seating assembly of claim 1 wherein the first conductor adjacent to the thermoelectric devices and the second conductor adjacent to the thermoelectric devices are configured to withstand temperature changes from −10 degrees Celsius to 55 degrees Celsius.

7. A seating assembly comprising:
   a seat defining a seating surface;
   a thermoelectric device;
   a first conductor and a second conductor; and
   wherein the thermoelectric device is arranged between the first conductor and the second conductor to cool or heat the seating surface, and further comprising an enhanced heat sink and an air mover wherein the enhanced heat sink is coupled to the second conductor and wherein the air mover is in fluid communication with the thermoelectric device.

8. A method of installing a conductive strip within a seating assembly, the method comprising the steps of:
   at least partially separating a surface portion of the seating assembly from a base portion of the seating assembly;

placing at least a portion of the conductive strip in an elongated area in the surface portion of the seating assembly or the base portion of the seating assembly; and at least partially attaching the surface portion of the seating assembly to the base portion of the seating assembly.

9. The method of claim 8 wherein the placing at least a portion of the conductive strip in an elongated area in the surface portion of the seating assembly or the base portion of the seating assembly comprises placing a plurality of thermoelectric devices coupled to a second conductor in an elongated area in the surface portion of the seating assembly wherein the seating assembly includes a first conductor.

10. The method of claim 8 further comprising:

electrically connecting the at least a portion of the conductive strip to an electrical connection in the seating assembly.

\* \* \* \* \*